United States Patent
Chang et al.

(10) Patent No.: US 8,605,643 B2
(45) Date of Patent: Dec. 10, 2013

(54) APPARATUS AND METHOD FOR RETRANSMITTING OF DATA IN A WIRELESS COMMUNICATION SYSTEM USING RELAY

(75) Inventors: Young-Bin Chang, Anyang-si (KR); Hyun-Jeong Kang, Seoul (KR); Taori Rakesh, Suwon-si (KR); Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 12/403,133

(22) Filed: Mar. 12, 2009

(65) Prior Publication Data

US 2009/0232044 A1    Sep. 17, 2009

(30) Foreign Application Priority Data

Mar. 14, 2008 (KR) .......... 10-2008-0024104
Mar. 19, 2008 (KR) .......... 10-2008-0025555

(51) Int. Cl.
*H04J 1/10* (2006.01)
*H04J 3/08* (2006.01)

(52) U.S. Cl.
USPC .................................................. 370/315

(58) Field of Classification Search
USPC ............. 370/242, 243, 246, 315; 714/748
See application file for complete search history.

(56) References Cited

U.S. PATENT DOCUMENTS

| | | | |
|---|---|---|---|
| 8,005,051 B2* | 8/2011 | Watanabe | 370/335 |
| 2007/0245204 A1* | 10/2007 | Yomo et al. | 714/749 |
| 2007/0277072 A1* | 11/2007 | Schaap et al. | 714/748 |
| 2008/0056173 A1* | 3/2008 | Watanabe | 370/315 |
| 2008/0188231 A1* | 8/2008 | Zhu et al. | 455/450 |
| 2008/0250293 A1* | 10/2008 | Taori et al. | 714/748 |
| 2008/0305740 A1* | 12/2008 | Horiuchi et al. | 455/11.1 |
| 2009/0049356 A1* | 2/2009 | Lin | 714/749 |
| 2009/0141676 A1* | 6/2009 | Maheshwari et al. | 370/329 |
| 2010/0054137 A1* | 3/2010 | Deng et al. | 370/247 |
| 2010/0099352 A1* | 4/2010 | Lee et al. | 455/15 |
| 2012/0120867 A1* | 5/2012 | Horiuchi et al. | 370/315 |

\* cited by examiner

*Primary Examiner* — Farah Faroul
(74) *Attorney, Agent, or Firm* — Jefferson IP Law, LLP

(57) ABSTRACT

An apparatus and method for retransmitting data in a wireless communication system are provided. The method includes transmitting data to at least one lower node, temporarily storing the data transmitted to the lower node, if ACKnowledgement (ACK) information of a relay link is not received for a predetermined time after data transmission or if the ACK information of the relay link is received from a lower Relay Station (RS), identifying if error occurrence information of an access link is received from the lower RS, and, if the ACK information of the access link is received from the lower RS, recognizing that data transmission to a Mobile Station (MS) succeeds.

16 Claims, 19 Drawing Sheets

APPARATUS AND METHOD FOR RETRANSMITTING OF DATA IN A WIRELESS COMMUNICATION SYSTEM USING RELAY

PRIORITY

This application claims the benefit under 35 U.S.C. §119 (a) of a Korean patent application filed in the Korean Intellectual Property Office on Mar. 14, 2008 and assigned Serial No. 10-2008-0024104 and a Korean patent application filed in the Korean Intellectual Property Office on Mar. 19, 2008 and assigned Serial No. 10-2008-0025555, the entire disclosures of both of which are hereby incorporated by reference.

BACKGROUND OF THE INVENTION

1. Field of the Invention

The present invention relates to an apparatus and method for performing Automatic Retransmission reQuest (ARQ) in a wireless communication system. More particularly, the present invention relates to an apparatus and method for performing ARQ in a wireless communication system using relay.

2. Description of the Related Art

In a wireless communication system, an error can occur in transmit/receive data depending on a channel state of a radio resource. A control and recovery technology for this error can be mainly divided into an Automatic Retransmission reQuest (ARQ) technique and a Forward Error Check (FEC) technique. The ARQ technique is a technique for transmitting a retransmission request to a transmit end for data lost in a receive end. The FEC technique is a technique for correcting an error for data lost in a receive end.

In the ARQ technique, if receive data is received without error, a receive end transmits an ACKnowledgement (ACK) message to a transmit end. If an error occurs in the receive data, the receive end transmits a Negative ACKnowledgement (NACK) message to the transmit end.

Thus, if the ACK message is received, the transmit end transmits new data to the receive end. If the NACK message is received, the transmit end retransmits data to the receive end in response to the NACK message.

A wireless communication system may include a relay service to provide a wireless channel to a Mobile Station (MS) located in an edge of a cell or a shadow area. When providing the relay service, the wireless communication system uses a Relay Station (RS) to relay data transmitted/received by a BS and an MS.

Therefore, a need exists for a method for performing ARQ using an RS for retransmitting of data in the wireless communication system using relay.

SUMMARY OF THE INVENTION

An aspect of the present invention is to address at least the above-mentioned problems and/or disadvantages and to provide at least the advantages described below. Accordingly, an aspect of the present invention is to provide an apparatus and method for performing an Automatic Retransmission reQuest (ARQ) of a Medium Access Control (MAC) layer for retransmitting of data in a wireless communication system using relay.

Another aspect of the present invention is to provide an apparatus and method for separating and performing relay link ARQ and access link ARQ for retransmitting of data in a wireless communication system using relay.

In accordance with an aspect of the present invention, a method for performing Automatic Retransmission reQuest (ARQ) in a Base Station (BS) of a wireless communication system is provided. The method includes transmitting data to at least one lower node, temporarily storing the data transmitted to the lower node, if ACKnowledgement (ACK) information of a relay link is not received for a certain time after data transmission or is received from a lower Relay Station (RS), confirming if error occurrence information of an access link is received from the lower RS, and, if the ACK information of the access link is received from the lower RS, recognizing that data transmission to a Mobile Station (MS) succeeds.

In accordance with another aspect of the present invention, an apparatus for performing ARQ in a BS of a wireless communication system is provided. The apparatus includes a transmitter, a storage unit, a receiver, and an ARQ controller. The transmitter transmits data to at least one lower node. The storage unit temporarily stores the data transmitted to the lower node. The receiver receives a signal. If ACK information of a relay link is not received for a certain time after data transmission or is received from a lower RS after the ACK information of the relay link is received from the lower RS, the ARQ controller recognizes that data transmission to an MS succeeds.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

A technology for performing Automatic Retransmission reQuest (ARQ) using a Relay Station (RS) in a wireless communication system according to an exemplary embodiment of the present invention is described below.

In the following description, an RS 1 relays a signal transmitted by a Base Station (BS) to an RS accessed by a Mobile Station (MS). Thus, in a two-hop wireless communication system, the RS 1 does not exist.

Also, in the following description, an MS represents one or more MSs having access to an RS.

Figure 1:
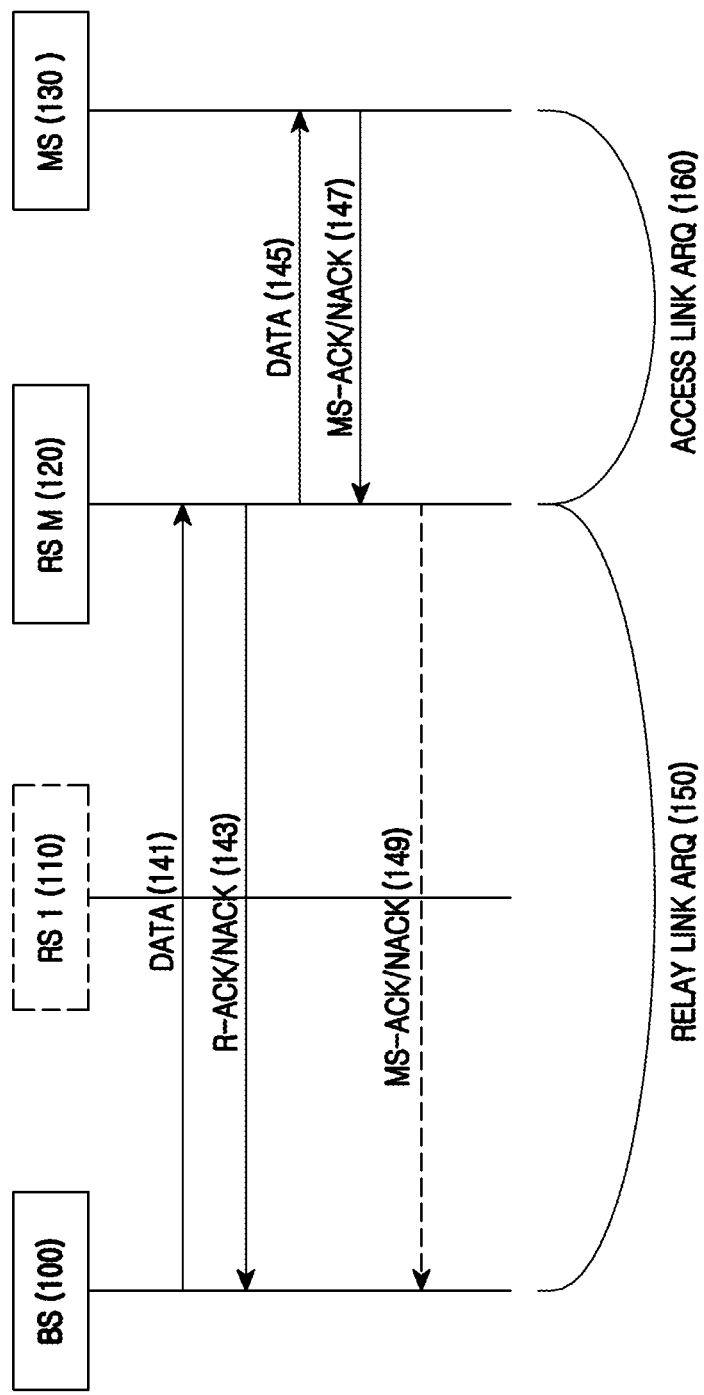
FIG. 1 is a ladder diagram illustrating a DownLink (DL) data transmission process in a wireless communication system according to an exemplary embodiment of the present invention.

If providing a relay service, a wireless communication system separates and performs relay link ARQ and access link ARQ as illustrated in FIG. 1 below.

FIG. 1 is a ladder diagram illustrating a DownLink (DL) data transmission process in a wireless communication system according to an exemplary embodiment of the present invention.

As illustrated in FIG. 1, the wireless communication system includes a BS 100, an RS 1 110, an RS M 120 and an MS 130.

In step 141, the BS 100 transmits data to the RS M 120 through the RS 1 110.

The RS M 120 confirms if an error occurs in the data received through the RS 1 110. For example, the RS M 120 confirms if an error occurs in the data using an error check code (i.e., a Cyclic Redundancy Check (CRC)) included in a Media Access Control (MAC) Packet Data Unit (PDU) of the data.

In step 143, the RS M 120 transmits error occurrence information on the data to the BS 100 through the RS 1 110. That is, the RS M 120 transmits error occurrence information of a relay link to the BS 100 through the RS 1 110. For example, if an error does not occur in the data, the RS M 120 transmits an R-ACK signal to the BS 100 through the RS 1 110. If an error occurs in the data, the RS M 120 transmits an R-NACK signal to the BS 100 through the RS 1 110.

In step 145, if an error does not occur in the data received through the RS 1 110, the RS M 120 transmits the data to the MS 130.

The MS 130 confirms if an error occurs in the data received from the RS M 120. For example, the MS 130 confirms if an error occurs in the data using an error check code included in a MAC PDU of the data.

In step 147, the MS 130 transmits error occurrence information on the data to the RS M 120. For example, if an error does not occur in the data, the MS 130 transmits an MS-ACK signal to the RS M 120. If an error occurs in the data, the MS 130 transmits an MS-NACK signal to the RS M 120.

In step 149, the RS M 120 transmits error occurrence information of an access link received from the MS 130, to the BS 100 through the RS 1 110.

In the aforementioned exemplary implementation, an RS M 120 transmits error occurrence information of an access link received from an MS 130, to a BS 100.

In an exemplary implementation, an RS M 120 separates and performs relay link ARQ 150 and access link ARQ 160. Thus, the RS M 120 may not transmit error occurrence information of an access link received from the MS 130 to the BS 100.

As described above, a wireless communication system separates and performs relay link ARQ and access link ARQ.

Figure 2:
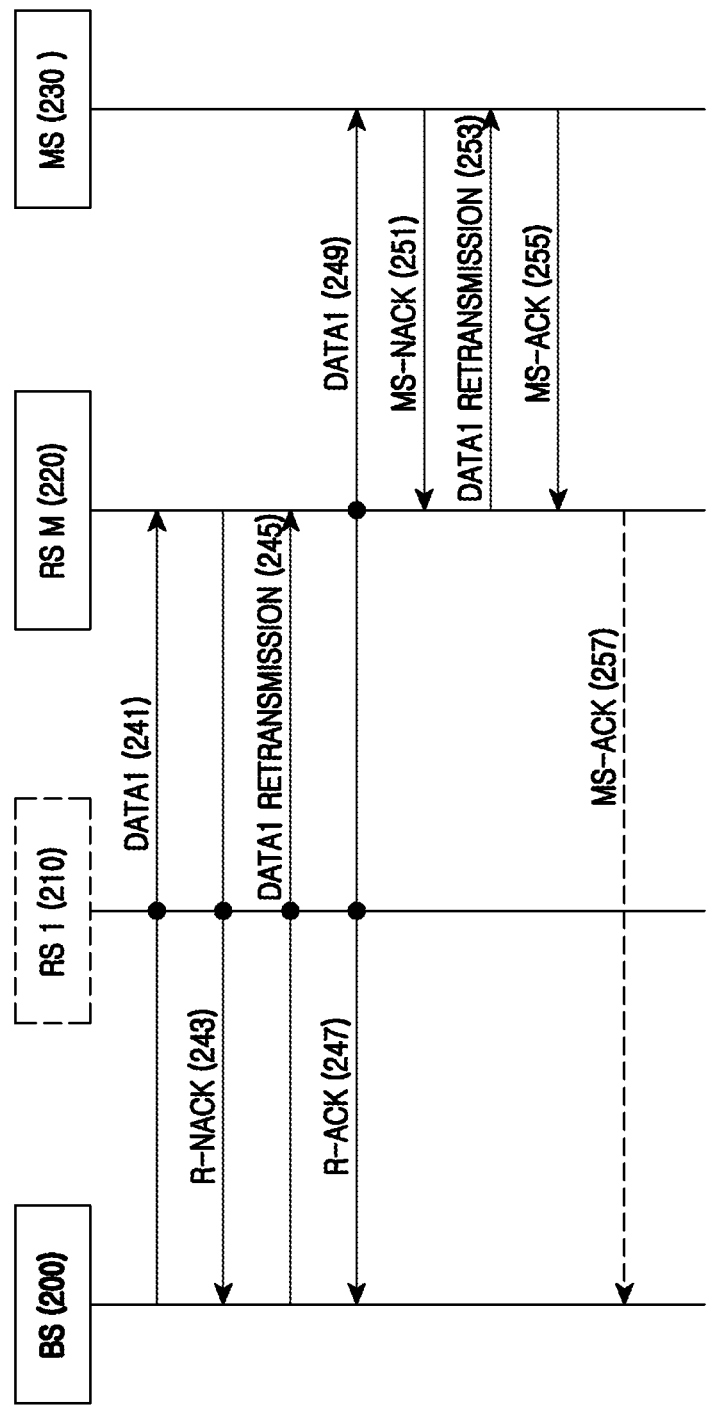
FIG. 2 is a ladder diagram illustrating a DL data retransmission process in a wireless communication system according to an exemplary embodiment of the present invention.

At this time, if an error occurs in data of a relay link and access link, the wireless communication system operates as illustrated in FIG. 2 below.

FIG. 2 is a ladder diagram illustrating a DL data retransmission process in a wireless communication system according to an exemplary embodiment of the present invention.

As illustrated in FIG. 2, the wireless communication system includes a BS 200, an RS 1 210, an RS M 220 and an MS 230.

In step 241, the BS 200 transmits data1 to the RS M 220 through the RS 1 210.

The RS M 220 confirms if an error occurs in the data1. For example, the RS M 220 confirms if an error occurs in the data1 using an error check code included in a MAC PDU of the data1.

If an error occurs in the data1, in step 243, the RS M 220 transmits an R-NACK signal to the BS 200 through the RS 1 210.

If the R-NACK signal is received, in step 245, the BS 200 retransmits data1 to the RS M 220 through the RS 1 210 in response to the R-NACK signal.

The RS M 220 confirms if an error occurs in the data1 retransmitted from the BS 200.

If an error does not occur in the data1, in step 247, the RS M 220 transmits an R-ACK signal to the BS 200 through the RS 1 210. Also, in step 249, the RS M 220 transmits the data1 to the MS 230.

The MS 230 confirms if an error occurs in the data1 received from the RS M 220.

If an error occurs in the data1, in step 251, the MS 230 transmits an MS-NACK signal to the RS M 230.

If the MS-NACK signal is received, in step 253, the RS M 220 retransmits data1 to the MS 230 in response to the MS-NACK signal.

The MS 230 confirms if an error occurs in the data1 retransmitted from the RS M 220.

If an error does not occur in the data1, in step 255, the MS 230 transmits an MS-ACK signal to the RS M 220.

In step 257, the RS M 220 transmits error occurrence information of an access link received from the MS 230, to the BS 200 through the RS 1 210.

In the aforementioned exemplary implementation, the RS M 220 transmits error occurrence information of an access link received from the MS 230 to the BS 200.

In an exemplary implementation, the RS M 220 separates and performs relay link ARQ and access link ARQ. Thus, the RS M 220 may not transmit error occurrence information of an access link received from the MS 230 to the BS 200.

As described above, a wireless communication system separates and performs relay link ARQ and access link ARQ. If the access link ARQ fails, the wireless communication system operates as illustrated in FIG. 3 below.

Figure 3:
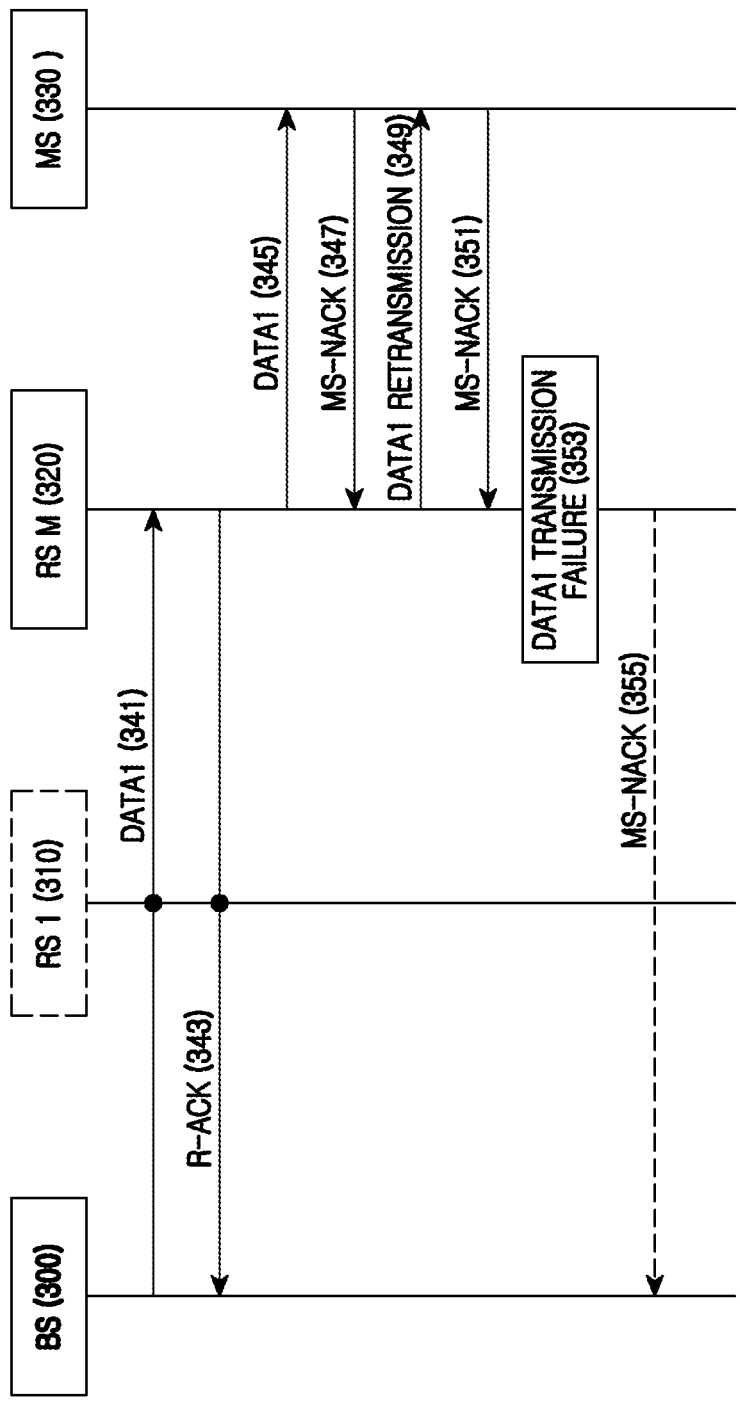
FIG. 3 is a ladder diagram illustrating a DL data retransmission process in a wireless communication system according to an exemplary embodiment of the present invention.

FIG. 3 is a ladder diagram illustrating a DL data retransmission process in a wireless communication system according to another exemplary embodiment of the present invention.

As illustrated in FIG. 3, the wireless communication system includes a BS 300, an RS 1 310, an RS M 320 and an MS 330.

In step 341, the BS 300 transmits data1 to the RS M 320 through the RS 1 310.

The RS M 320 confirms if an error occurs in the data1 received from the RS 1 310. For example, the RS M 320 confirms if an error occurs in the data1 using an error check code included in a MAC PDU of the data1.

If an error does not occur in the data1, in step 343, the RS M 320 transmits an R-ACK signal to the BS 300 through the RS 1 310. Also, in step 345, the RS M 320 transmits the data1 to the MS 330.

The MS 330 confirms if an error occurs in the data1. For example, the MS 330 confirms an error in the data1 using an error check code included in a MAC PDU of the received data 1.

If an error occurs in the data1, in step 347, the MS 330 transmits an MS-NACK signal to the RS M 320.

If the MS-NACK signal is received, the RS M 320 confirms whether it can perform data1 retransmission. For example, the RS M 320 confirms whether it can perform data1 retransmission by confirming the number of times of data1 retransmission or an RS-MS timer. If the number of times of data1 retransmission exceeds a reference number of times of retransmission or the RS-MS timer expires, the RS M 320 determines that it cannot perform the data1 retransmission. For example, the RS M 320 confirms whether it can perform data1 retransmission under control of the BS 300. That is, the BS 300 drives a BS-RS timer for relay link ARQ with the RS M 320 and a BS-MS timer for data transmitted to the MS 330. Accordingly, the BS 300 transmits a reset signal to the RS M 320 such that, if the BS-MS timer expires, the RS M 320 discontinues retransmission to the MS 330. In this case, if the reset signal is received, the RS M 320 determines that it cannot perform data1 retransmission.

If the RS M 320 can perform the data1 retransmission, in step 349, the RS M 320 retransmits data1 to the MS 330 in response to the MS-NACK signal.

The MS 330 confirms if an error occurs in the data1 retransmitted from the RS M 320.

If an error occurs in the data1, in step 351, the MS 330 transmits an MS-NACK signal to the RS M 320.

If the MS-NACK signal is received, the RS M 320 confirms whether it can perform data1 retransmission.

If the RS M 320 cannot perform the data1 retransmission in step 353, in step 355, the RS M 320 transmits access link ARQ failure information (i.e., an MS-NACK signal) to the BS 300 through the RS 1 310.

In the aforementioned exemplary implementation, the RS M 320 transmits access link ARQ failure information to the BS 300.

In an exemplary implementation, the RS M 320 separates and performs relay link ARQ and access link ARQ and thus, may not transmit access link ARQ failure information to the BS 300.

Figure 4:
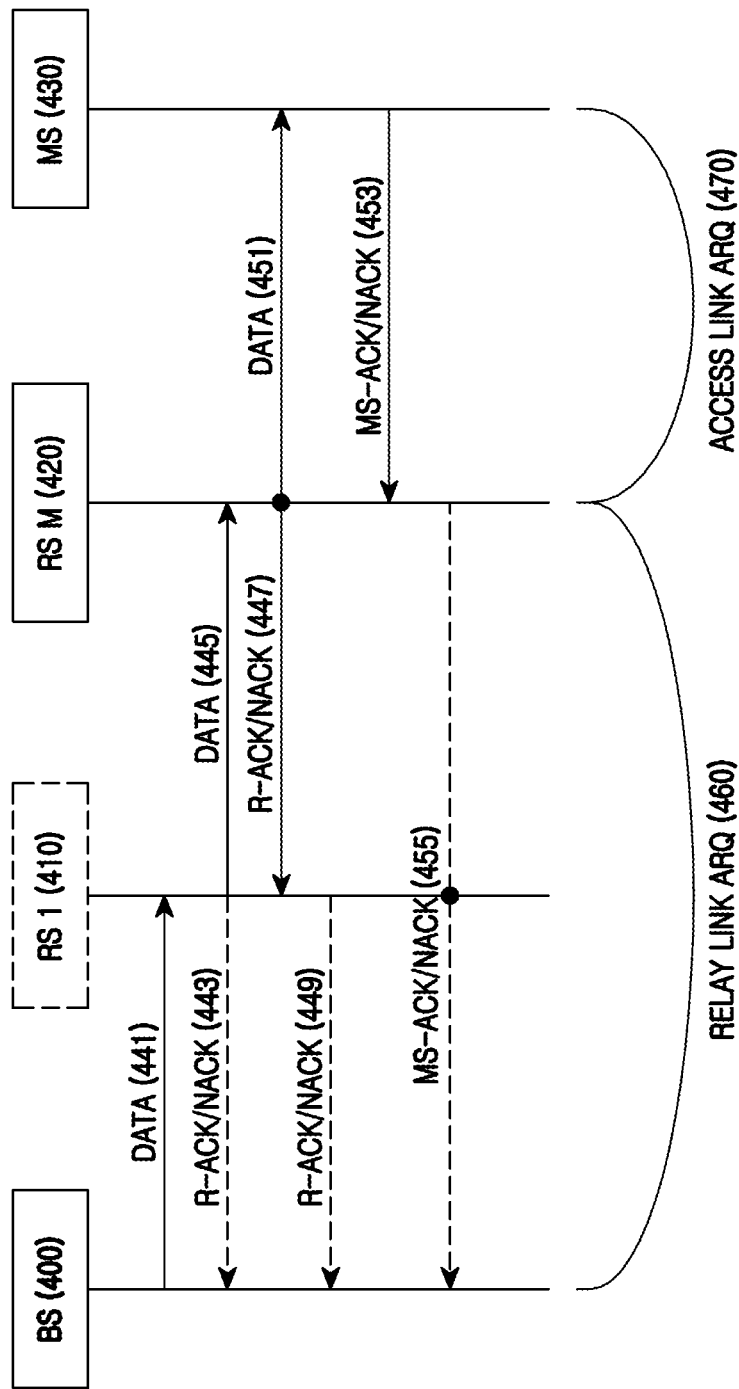
FIG. 4 is a ladder diagram illustrating a DL data transmission process in a wireless communication system according to an exemplary embodiment of the present invention.

If providing a relay service, a wireless communication system may separate and perform relay link ARQ and access link ARQ as illustrated in FIG. 4 below.

FIG. 4 is a ladder diagram illustrating a DL data transmission process in a wireless communication system according to an exemplary embodiment of the present invention.

As illustrated in FIG. 4, the wireless communication system includes a BS 400, an RS 1 410, an RS M 420 and an MS 430.

In step 441, the BS 400 transmits data to the RS 1 410.

The RS 1 410 confirms if an error occurs in the data received from the BS 400. For instance, the RS 1 410 confirms if an error occurs in the data using an error check code included in a MAC PDU of the data.

Then, in step 443, the RS 1 410 transmits error occurrence information on the data to the BS 400. For example, if an error occurs in the data, the RS 1 410 transmits an R-NACK signal to the BS 400. If an error does not occur in the data, the RS 1 410 transmits an R-ACK signal to the BS 400.

If an error does not occur in the data, in step 445, the RS 1 410 transmits the data to the RS M 420.

The RS M 420 confirms if an error occurs in the data received from the RS 1 410. For example, the RS M 420 confirms if an error occurs in the data using an error check code (i.e., a CRC) included in a MAC PDU of the data.

Then, in steps 447 and 449, the RS M 420 transmits error occurrence information on the data to the BS 400 through the RS 1 410. That is, the RS M 420 transmits error occurrence information of a relay link to the BS 400 through the RS 1 410. For example, if an error occurs in the data, the RS M 420 transmits an R-NACK signal to the BS 400 through the RS 1 410. If an error does not occur in the data, the RS M 420 transmits an R-ACK signal to the BS 400 through the RS 1 410.

If an error does not occur in the data, in step 451, the RS M 420 transmits the data to the MS 430.

The MS 430 confirms if an error occurs in the data received from the RS M 420. For example, the MS 430 confirms error occurrence information on the data using an error check code included in a MAC PDU of the data.

Then, in step 453, the MS 430 transmits the error occurrence information on the data to the RS M 420. For example, if an error does not occur in the data, the MS 430 transmits an MS-ACK signal to the RS M 420. If an error occurs in the data, the MS 430 transmits an MS-NACK signal to the RS M 420.

In step 455, the RS M 420 transmits error occurrence information of an access link received from the MS 430, to the BS 400 through the RS 1 410.

In the aforementioned exemplary implementation, the RS M 420 transmits error occurrence information of an access link received from the MS 430 to the BS 400.

In an exemplary implementation, the RS M 420 separates and performs relay link ARQ 460 and access link ARQ 470. Thus, the RS M 420 may not transmit error occurrence information of an access link received from the MS 430 to the BS 400.

The RS 1 410 and RS M 420 may selectively transmit error occurrence information of a relay link. For example, the RS 1 410 and RS M 420 may transmit an R-ACK signal and R-NACK signal to the BS 400. Also, the RS 1 410 and RS M 420 may transmit only an R-NACK signal to the BS 400. Further, the RS 1 410 and RS M 420 may not transmit error occurrence information on data of a relay link.

Figure 5:
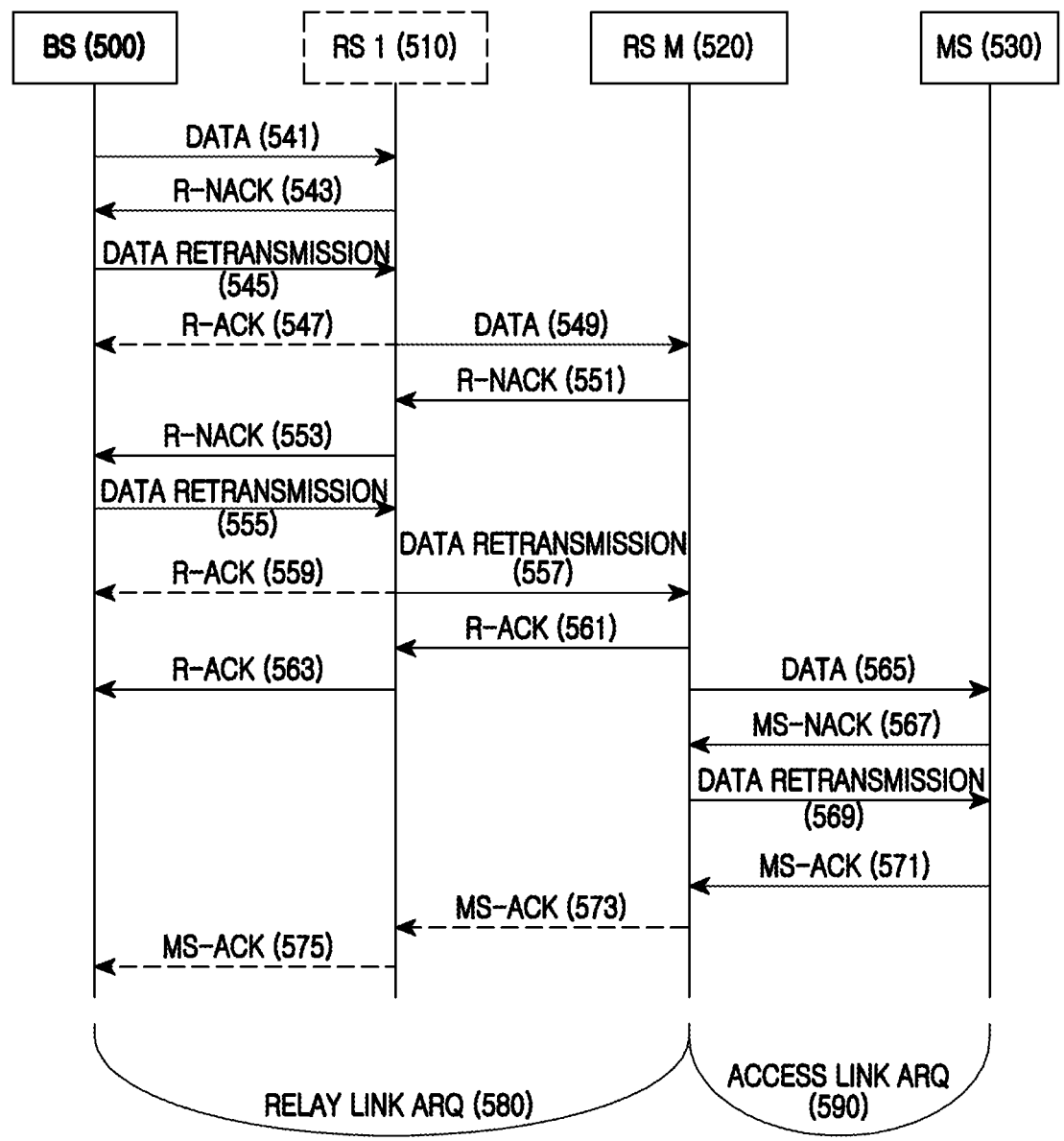
FIG. 5 is a ladder diagram illustrating a DL data retransmission process based on an ACKnowledgement (ACK) signal in a wireless communication system according to an exemplary embodiment of the present invention.

If an RS transmits an R-ACK signal and R-NACK signal to a BS, a wireless communication system operates as illustrated in FIG. 5 below.

FIG. 5 is a ladder diagram illustrating a DL data retransmission process based on an ACK signal in a wireless communication system according to an exemplary embodiment of the present invention.

As illustrated in FIG. 5, the wireless communication system includes a BS 500, an RS 1 510, an RS M 520 and an MS 530.

In step 541, the BS 500 transmits data to the RS 1 510.

The RS 1 510 confirms if an error occurs in the data received from the BS 500.

If an error occurs in the data, in step 543, the RS 1 510 transmits an R-NACK signal to the BS 500.

If the R-NACK signal is received, in step 545, the BS 500 retransmits data to the RS 1 510 in response to the R-NACK signal.

The RS 1 510 confirms if an error occurs in the data retransmitted from the BS 500.

If an error does not occur in the data, in step 547, the RS 1 510 transmits an R-ACK signal to the BS 500. Also, in step 549, the RS 1 510 transmits the data to the RS M 520.

The RS M 520 confirms if an error occurs in the data received from the RS 1 510.

If an error occurs in the data, in steps 551 and 553, the RS M 520 transmits an R-NACK signal to the BS 500 through the RS 1 510.

If the R-NACK signal is received, in steps 555 and 557, the BS 500 retransmits data to the RS M 520 through the RS 1 510 in response to the R-NACK signal. For example, the RS 1 510 confirms if an error occurs in the data retransmitted from the BS 500. If an error does not occur in the data, in step 557, the RS 1 510 transmits the data to the RS M 520. Also, in step 559, the RS 1 510 transmits an R-ACK signal to the BS 500.

The RS M 520 confirms if an error occurs in the data retransmitted from the BS 500.

If an error does not occur in the data, in steps 561 and 563, the RS M 520 transmits an R-ACK signal to the BS 500 through the RS 1 510. Also, in step 565, the RS M 520 transmits the data to the MS 530.

The MS 530 confirms if an error occurs in the data received from the RS M 520.

If an error occurs in the data, in step 567, the MS 530 transmits an MS-NACK signal to the RS M 520.

If the MS-NACK signal is received, in step 569, the RS M 520 retransmits data to the MS 530 in response to the MS-NACK signal.

The MS 530 confirms if an error occurs in the data retransmitted from the RS M 520.

If an error does not occur in the data, in step 571, the MS 530 transmits an MS-ACK signal to the RS M 520.

In steps 573 and 575, the RS M 520 transmits error occurrence information of an access link received from the MS 530, to the BS 500 through the RS 1 510.

In the aforementioned exemplary implementation, the RS M 520 transmits error occurrence information of an access link received from the MS 530 to the BS 500.

In an exemplary implementation, the RS M 520 separates and performs relay link ARQ 580 and access link ARQ 590. Thus, the RS M 520 may not transmit error occurrence information of an access link received from the MS 530 to the BS 500.

Also, the BS 500 controls relay link ARQ. Accordingly, the RS 1 510 transmits an R-NACK signal received from the RS M 520 to the BS 500. The BS 500 retransmits data in response to the R-NACK signal. If the BS 500 confirms an RS transmitting an R-NACK signal, the BS 500 may transmit a retransmission instruction signal to an upper RS of the RS transmitting the R-NACK signal and perform relay link ARQ.

In another exemplary embodiment of the present invention, an RS may control relay link ARQ. In this case, the wireless communication system operates as illustrated in FIG. 6 below.

Figure 6:
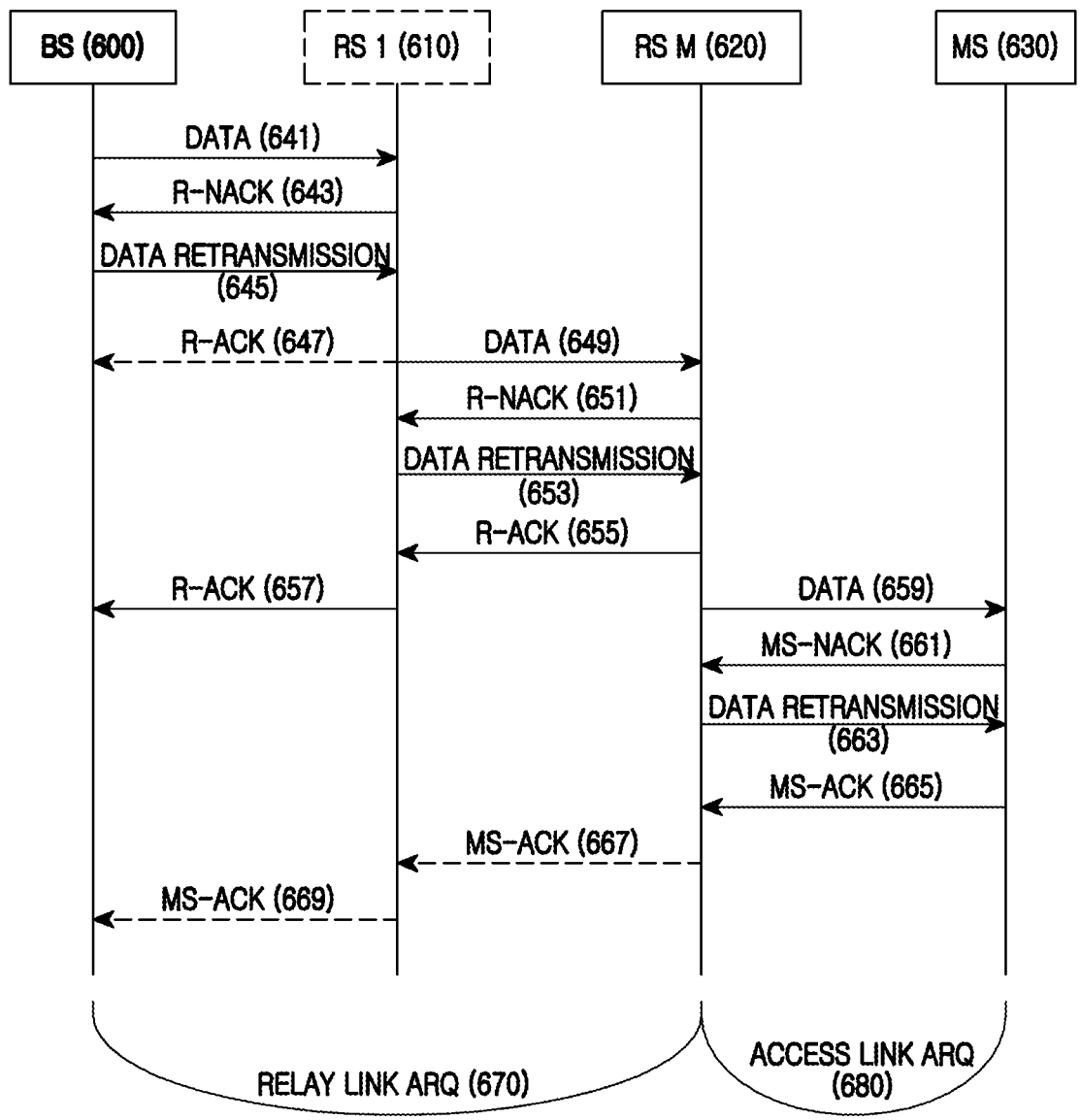
FIG. 6 is a ladder diagram illustrating a DL data retransmission process based on an ACK signal in a wireless communication system according to an exemplary embodiment of the present invention.

FIG. 6 is a ladder diagram illustrating a DL data retransmission process based on an ACK signal in a wireless communication system according to another exemplary embodiment of the present invention.

As illustrated in FIG. 6, the wireless communication system includes a BS 600, an RS 1 610, an RS M 620 and an MS 630.

In step 641, the BS 600 transmits data to the RS 1 610.

The RS 1 610 confirms if an error occurs in the data received from the BS 600.

If an error occurs in the data, in step 643, the RS 1 610 transmits an R-NACK signal to the BS 600.

If the R-NACK signal is received, in step 645, the BS 600 retransmits data to the RS 1 610 in response to the R-NACK signal.

The RS 1 610 confirms if an error occurs in the data retransmitted from the BS 600.

If an error does not occur in the data, in step 647, the RS 1 610 transmits an R-ACK signal to the BS 600. Also, in step 649, the RS 1 610 transmits the data to the RS M 620.

The RS M 620 confirms if an error occurs in the data received from the RS 1 610.

If an error occurs in the data, in step 651, the RS M 620 transmits an R-NACK signal to the RS 1 610.

If the R-NACK signal is received, in step 653, the RS 1 610 retransmits data to the RS M 620 in response to the R-NACK signal.

The RS M 620 confirms if an error occurs in the data retransmitted from the RS 1 610.

If an error does not occur in the data, in steps 655 and 657, the RS M 620 transmits an R-ACK signal to the BS 600 through the RS 1 610. Also, in step 659, the RS M 620 transmits the data to the MS 630.

The MS 630 confirms if an error occurs in the data received from the RS M 620.

If an error occurs in the data, in step 661, the MS 630 transmits an MS-NACK signal to the RS M 620.

If the MS-NACK signal is received, in step 663, the RS M 620 retransmits data to the MS 630 in response to the MS-NACK signal.

The MS 630 confirms if an error occurs in the data retransmitted from the RS M 620.

If an error does not occur in the data, in step 665, the MS 630 transmits an MS-ACK signal to the RS M 620.

In steps 667 and 669, the RS M 620 transmits error occurrence information (i.e., an MS-ACK signal) of an access link received from the MS 630, to the BS 600 through the RS 1 610.

In the aforementioned exemplary implementation, the RS M 620 transmits error occurrence information of an access link received from the MS 630 to the BS 600.

In an exemplary implementation, the RS M 620 separates and performs relay link ARQ 670 and access link ARQ 680 and thus, may not transmit error occurrence information of an access link received from the MS 630 to the BS 600.

Also, the RS 1 610 transmits an R-ACK signal received from the RS M 620 to the BS 600.

In an exemplary implementation, the RS 1 610 retransmits data in response to an R-NACK signal and thus, may not transmit an R-ACK signal received from the RS M 620 to the BS 600.

Figure 7:
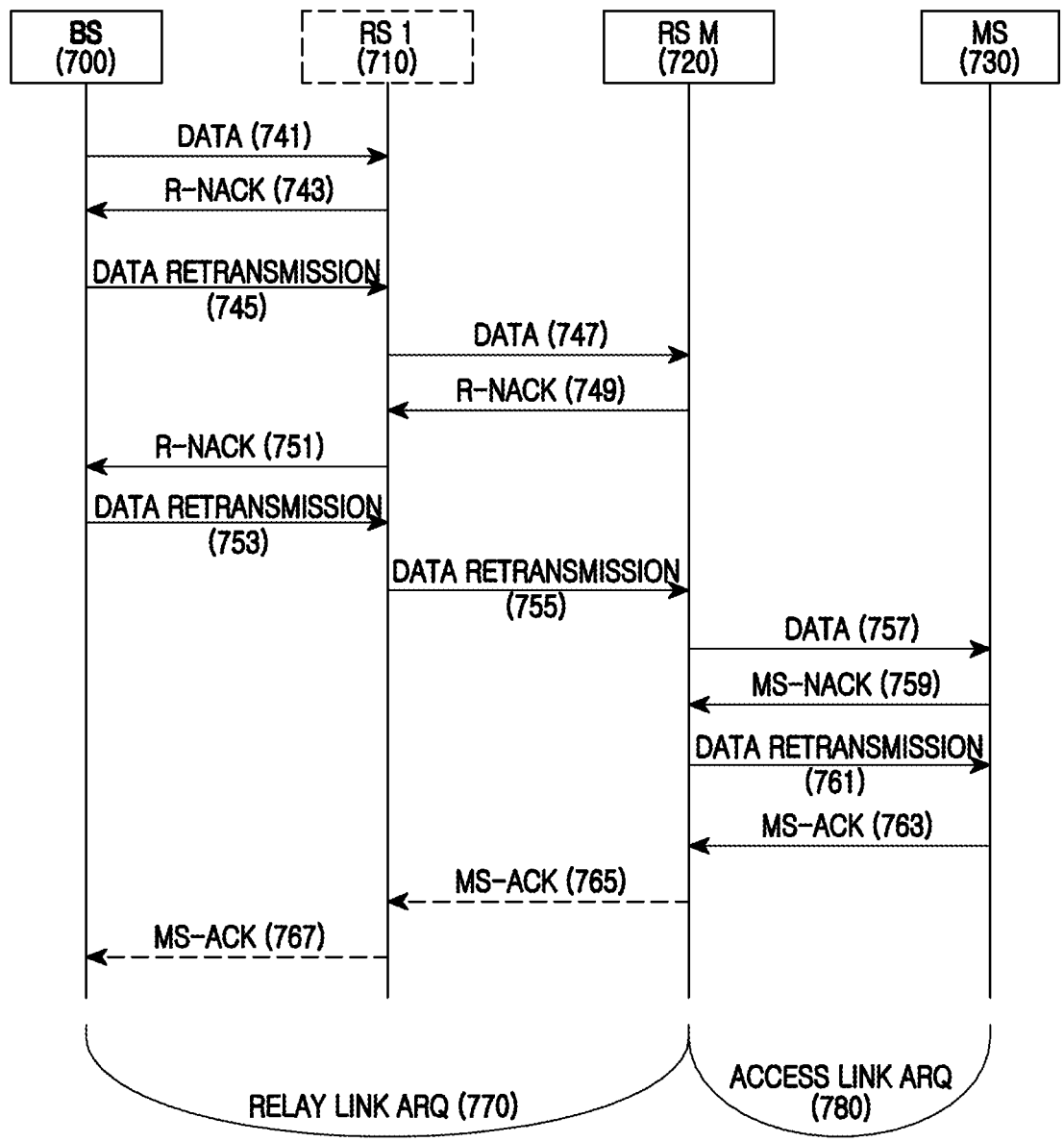
FIG. 7 is a ladder diagram illustrating a DL data retransmission process based on a Negative ACKnowledgement (NACK) signal in a wireless communication system according to an exemplary embodiment of the present invention.

If an RS transmits an R-NACK signal to a BS, a wireless communication system operates as illustrated in FIG. 7 below.

FIG. 7 is a ladder diagram illustrating a DL data retransmission process based on a NACK signal in a wireless communication system according to an exemplary embodiment of the present invention.

As illustrated in FIG. 7, the wireless communication system includes a BS 700, an RS 1 710, an RS M 720 and an MS 730.

In step 741, the BS 700 transmits data to the RS 1 710.

The RS 1 710 confirms if an error occurs in the data received from the BS 700.

If an error occurs in the data, in step 743, the RS 1 710 transmits an R-NACK signal to the BS 700.

If the R-NACK signal is received, in step 745, the BS 700 retransmits data to the RS 1 710 in response to the R-NACK signal.

The RS 1 710 confirms if an error occurs in the data retransmitted from the BS 700.

If an error does not occur in the data, in step 747, the RS 1 710 transmits the data to the RS M 720.

The RS M 720 confirms if an error occurs in the data received from the RS 1 710.

If an error occurs in the data, in steps 749 and 751, the RS M 720 transmits an R-NACK signal to the BS 700 through the RS 1 710.

If the R-NACK signal is received, in steps 753 and 755, the BS 700 retransmits data to the RS M 720 through the RS 1 710 in response to the R-NACK signal.

The RS M 720 confirms if an error occurs in the data retransmitted from the BS 700.

If an error does not occur in the data, in step 757, the RS M 720 transmits the data to the MS 730.

The MS 730 confirms if an error occurs in the data received from the RS M 720.

If an error occurs in the data, in step 759, the MS 730 transmits an MS-NACK signal to the RS M 720.

If the MS-NACK signal is received, in step 761, the RS M 720 retransmits data to the MS 730 in response to the MS-NACK signal.

The MS 730 confirms if an error occurs in the data retransmitted from the RS M 720.

If an error does not occur in the data, in step 763, the MS 730 transmits an MS-ACK signal to the RS M 720.

In steps 765 and 767, the RS M 720 transmits error occurrence information (i.e., an MS-ACK signal) of an access link received from the MS 730, to the BS 700 through the RS 1 710.

In the aforementioned exemplary implementation, the RS M 720 transmits error occurrence information of an access link received from the MS 730 to the BS 700.

In an exemplary implementation, the RS M 720 separates and performs relay link ARQ 770 and access link ARQ 780 and thus, may not transmit error occurrence information of an access link received from the MS 730 to the BS 700.

Also, the BS 700 controls relay link ARQ. Accordingly, the RS 1 710 transmits an R-NACK signal received from the RS M 720 to the BS 700. The BS 700 retransmits data in response to the R-NACK signal. If the BS 700 confirms an RS transmitting an R-NACK signal, the BS 700 may transmit a retransmission instruction signal to an upper RS of the RS transmitting the R-NACK signal and perform relay link ARQ.

In an exemplary implementation, the RS may also control relay link ARQ. In this case, the wireless communication system operates as illustrated in FIG. 8 below.

Figure 8:
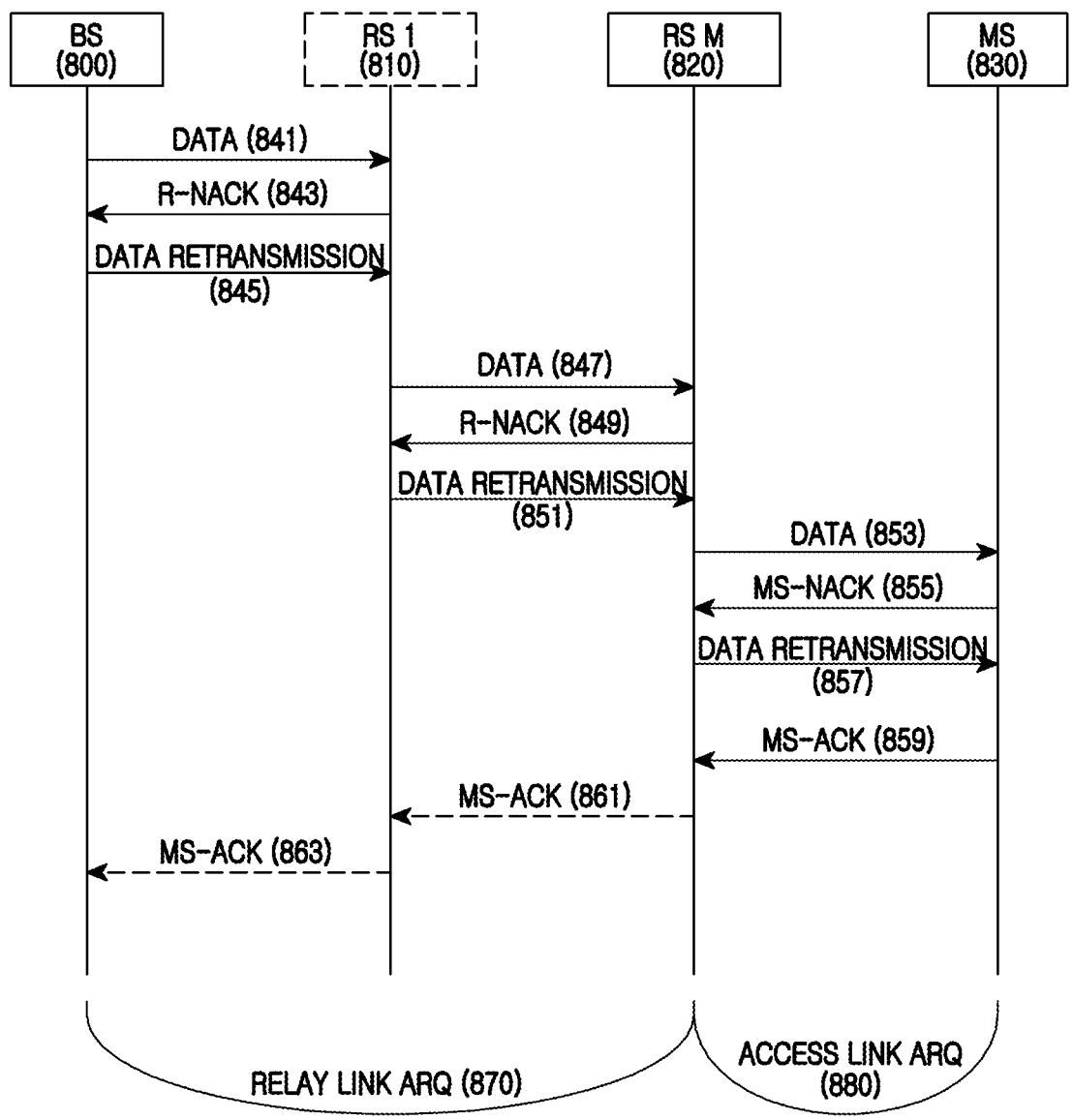
FIG. 8 is a ladder diagram illustrating a DL data retransmission process based on a NACK signal in a wireless communication system according to an exemplary embodiment of the present invention.

FIG. 8 is a ladder diagram illustrating a DL data retransmission process based on a NACK signal in a wireless communication system according to an exemplary embodiment of the present invention.

As illustrated in FIG. 8, the wireless communication system includes a BS 800, an RS 1 810, an RS M 820 and an MS 830.

In step 841, the BS 800 transmits data to the RS 1 810.

The RS 1 810 confirms if an error occurs in the data received from the BS 800.

If an error occurs in the data, in step 843, the RS 1 810 transmits an R-NACK signal to the BS 800.

If the R-NACK signal is received, in step 845, the BS 800 retransmits data to the RS 1 810 in response to the R-NACK signal.

The RS 1 810 confirms if an error occurs in the data retransmitted from the BS 800.

If an error does not occur in the data, in step 847, the RS 1 810 transmits the data to the RS M 820.

The RS M 820 confirms if an error occurs in the data received from the RS 1 810.

If an error occurs in the data, in step 849, the RS M 820 transmits an R-NACK signal to the RS 1 810.

If the R-NACK signal is received, in step 851, the RS 1 810 retransmits data to the RS M 820 in response to the R-NACK signal.

The RS M 820 confirms if an error occurs in the data retransmitted from the RS 1 810.

If an error does not occur in the data, in step 853, the RS M 820 transmits the data to the MS 830.

The MS 830 confirms if an error occurs in the data received from the RS M 820.

If an error occurs in the data, in step 855, the MS 830 transmits an MS-NACK signal to the RS M 820.

If the MS-NACK signal is received, in step 857, the RS M 820 retransmits data to the MS 830 in response to the MS-NACK signal.

The MS 830 confirms if an error occurs in the data retransmitted from the RS M 820.

If an error does not occur in the data, in step 859, the MS 830 transmits an MS-ACK signal to the RS M 820.

In steps 861 and 863, the RS M 820 transmits error occurrence information (i.e., an MS-ACK signal) of an access link received from the MS 830, to the BS 800 through the RS 1 810.

In the aforementioned exemplary implementation, the RS M 820 transmits error occurrence information of an access link received from the MS 830 to the BS 800.

In an exemplary implementation, the RS M 820 separates and performs relay link ARQ 870 and access link ARQ 880. Thus, the RS M 820 may not transmit error occurrence information of an access link received from the MS 830 to the BS 800.

An operation method of a BS for transmitting data to an RS is described below.

Figure 9:
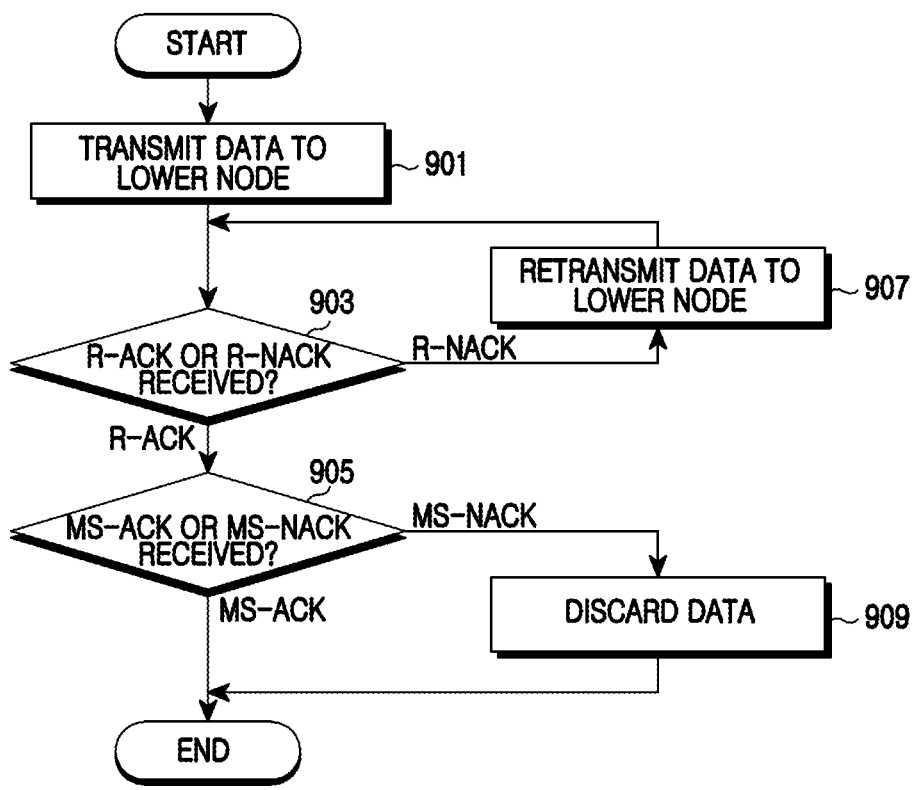
FIG. 9 is a flow diagram illustrating an operation process of a Base Station (BS) according to an exemplary embodiment of the present invention.

FIG. 9 is a flow diagram illustrating an operation process of a BS according to an exemplary embodiment of the present invention.

Referring to FIG. 9, in step 901, the BS transmits data to a lower node. That is, the BS transmits data to be transmitted to an MS to a lower RS.

In step 903, the BS confirms if error occurrence information of a relay link is received from the lower RS to which the data is transmitted in step 901. The error occurrence information of the relay link represents an R-ACK signal or R-NACK signal for the data transmitted to the lower RS.

If the R-NACK signal for the data transmitted to the lower RS is received, in step 907, the BS retransmits data to the lower RS in response to the R-NACK signal.

Then, the BS returns to step 903 and confirms if error occurrence information of a relay link on the retransmitted data is received.

If the R-ACK signal for the data transmitted to the lower RS is received, in step 905, the BS confirms if error occurrence information on an access link is received from the lower RS. The error occurrence information of the access link represents an MS-ACK signal or MS-NACK signal for the data transmitted to the MS from the lower RS.

If the MS-NACK signal is received from the lower RS, in step 909, the BS discards the data in response to the MS-NACK signal.

If the MS-ACK signal is received from the lower RS, the BS determines that transmission of data responsive to the MS-ACK signal is completed. At this time, the BS discards the data in response to the MS-ACK signal.

The BS then terminates the process according to an exemplary embodiment of the present invention.

In the aforementioned exemplary implementation, the BS excludes a BS-MS timer and a BS-RS timer. In another exemplary implementation, the BS includes a BS-MS timer and BS-RS timer, wherein the BS transmits data to a lower node and drives the BS-MS timer and BS-RS timer. At this time, if the BS-RS timer expires, the BS discontinues relay link ARQ. If the BS-MS timer expires, the BS discontinues access link ARQ to an RS M accessed by an MS.

In an exemplary implementation, a BS may also confirm a relay link ARQ and access link ARQ execution time using one ARQ timer. In this case, although the relay link ARQ execution time expires, the BS does not terminate the ARQ timer until the access link ARQ execution time expires.

An operation method of an RS for relaying data transmitted from a BS to an MS is described below.

Figure 10:
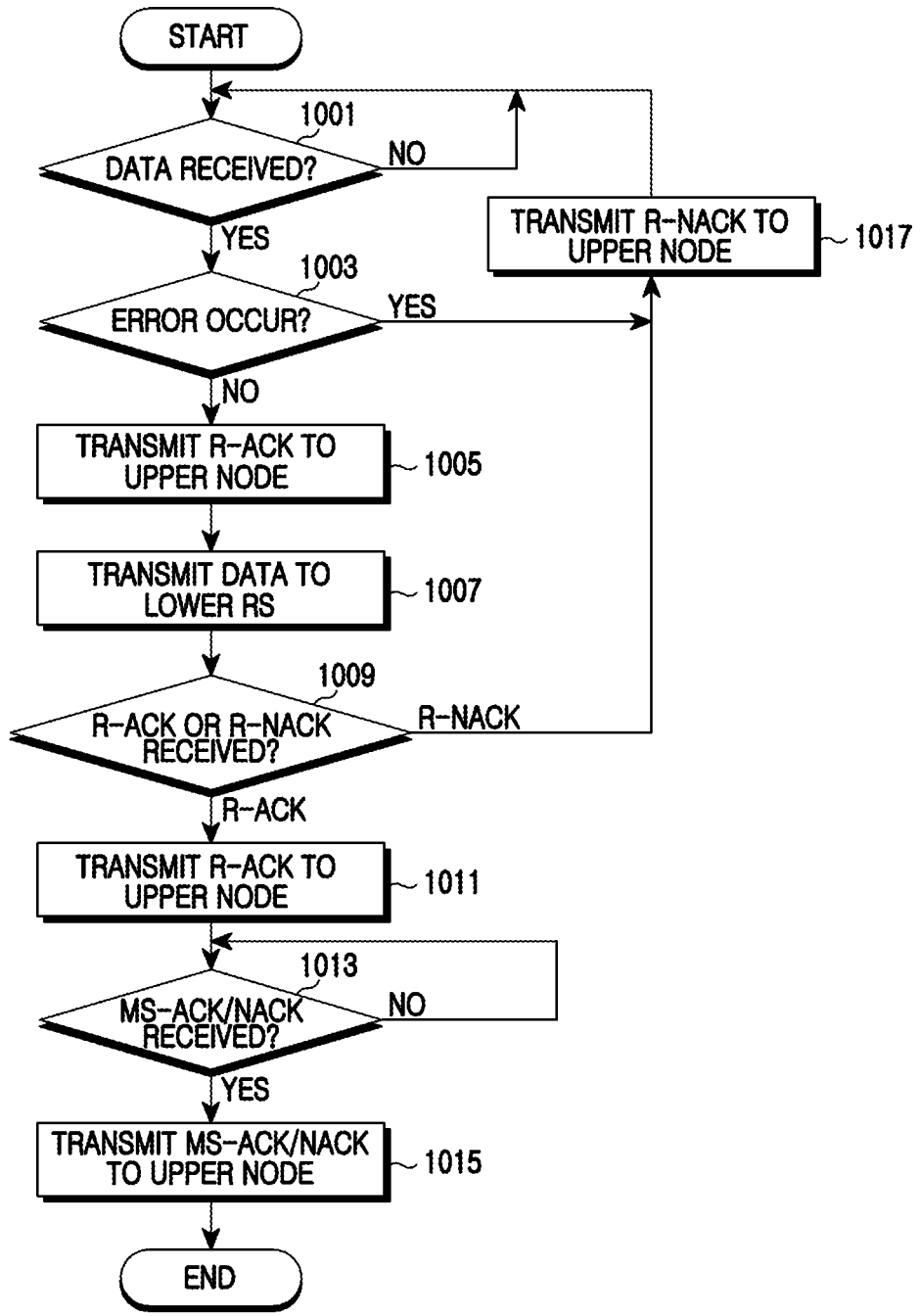
FIG. 10 is a flow diagram illustrating an operation process of a Relay Station (RS) according to an exemplary embodiment of the present invention.

First, an RS transmitting data received from a BS to a lower RS operates as illustrated in FIG. 10 below.

FIG. 10 is a flow diagram illustrating an operation process of an RS according to an exemplary embodiment of the present invention.

Referring to FIG. 10, in step 1001, the RS confirms if data is received from an upper node. The upper node represents a BS or an upper RS.

If the data is received, in step 1003, the RS confirms if an error occurs in the data received from the upper node. For example, the RS confirms if an error occurs in the data using an error check code included in a MAC PDU of the data.

If an error occurs in the data, in step 1017, the RS transmits an R-NACK signal for the data received from the upper node, to the upper node.

Then, the RS returns to step 1001 and confirms if data responsive to the R-NACK signal is received from the upper node.

If an error does not occur in the data in step 1003, the RS goes to step 1005 and transmits an R-ACK signal for the data received from the upper node, to the upper node.

After transmitting the R-ACK signal, in step 1007, the RS transmits the non-error data to a lower RS.

After transmitting the data, in step 1009, the RS confirms if error occurrence information of a relay link is received from the lower RS to which the data is transmitted. For example, the RS confirms if an R-NACK signal or R-ACK signal is received from the lower RS.

If the R-NACK signal is received from the lower RS, in step 1017, the RS transmits the R-NACK signal received from the lower RS, to the upper node.

If the R-ACK signal is received from the lower RS in step 1009, the RS goes to step 1011 and transmits the R-ACK signal received from the lower RS, to the upper node.

Then, in step 1013, the RS confirms if error occurrence information of an access link is received from the lower RS. For example, the RS confirms if an MS-NACK signal or MS-ACK signal is received from the lower RS.

If the MS-ACK signal or MS-NACK signal is received from the lower RS, in step 1015, the RS transmits the MS-ACK signal or MS-NACK signal received from the lower RS, to the upper node.

Then, the RS terminates the process according to an exemplary embodiment of the present invention.

In the aforementioned exemplary implementation, the RS does not control relay link ARQ. If the RS controls the relay link ARQ, the RS operates as illustrated in FIG. 11 below.

Figure 11:
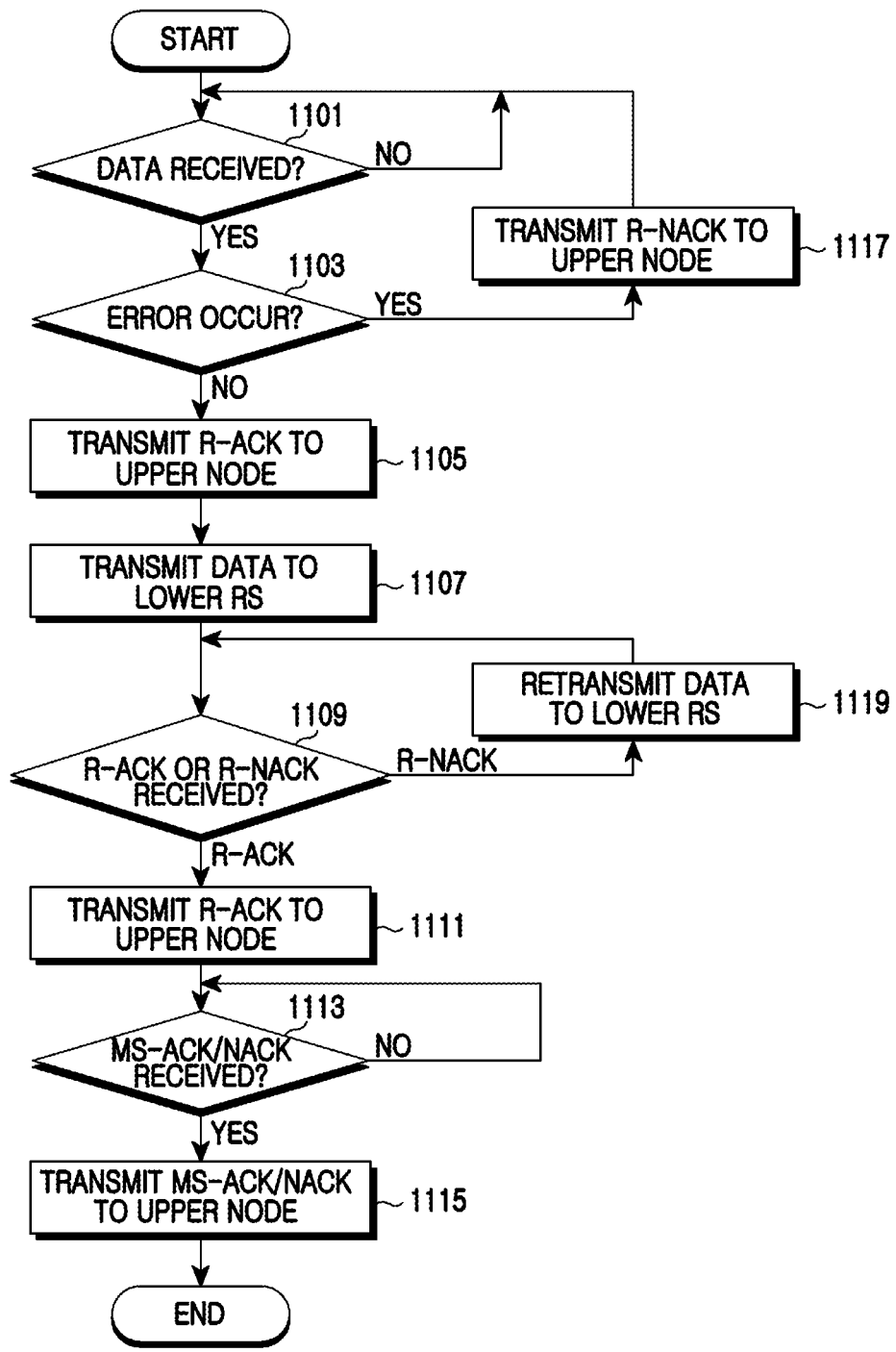
FIG. 11 is a flow diagram illustrating an operation process of an RS according to an exemplary embodiment of the present invention.

FIG. 11 is a flow diagram illustrating an operation process of an RS according to another exemplary embodiment of the present invention.

Referring to FIG. 11, in step 1101, the RS confirms if data is received from an upper node. The upper node represents a BS or an upper RS.

If the data is received, in step 1103, the RS confirms if an error occurs in the data received from the upper node. For example, the RS confirms if an error occurs in the data using an error check code included in a MAC PDU of the data.

If an error occurs in the data, in step 1117, the RS transmits an R-NACK signal for the data received from the upper node, to the upper node.

The RS returns to step 1101 and confirms if data responsive to the R-NACK signal is received from the upper node.

If an error does not occur in the data in step 1103, the RS goes to step 1105 and transmits an R-ACK signal for the data received from the upper node, to the upper node.

After transmitting the R-ACK signal, in step 1107, the RS transmits the non-error data to a lower RS.

After transmitting the data, in step 1109, the RS confirms if an R-NACK signal or R-ACK signal is received from the lower RS.

If the R-NACK signal is received from the lower RS, in step 1119, the RS retransmits data to the lower RS in response to the R-NACK signal received from the lower RS.

If the R-ACK signal is received from the lower RS in step 1109, the RS goes to step 1111 and transmits the R-ACK signal received from the lower RS, to the upper node.

Then, in step 1113, the RS confirms if error occurrence information of an access link is received from the lower RS. For example, the RS confirms if an MS-NACK signal or MS-ACK signal is received from the lower RS.

If the MS-ACK signal or MS-NACK signal is received from the lower RS, in step 1115, the RS transmits the MS-ACK signal or MS-NACK signal received from the lower RS, to the upper node.

Then, the RS terminates the process according to an exemplary embodiment of the present invention.

In the aforementioned exemplary implementation, the RS excludes an RS-RS timer representing an expiration time of relay link ARQ with the lower RS. The RS drives the RS-RS timer when transmitting data to the lower RS.

Considering an RS-RS timer, if the RS-RS timer expires, an RS discontinues relay link ARQ with a lower RS.

An operation of an RS transmitting data to an MS is described below.

Figure 12:
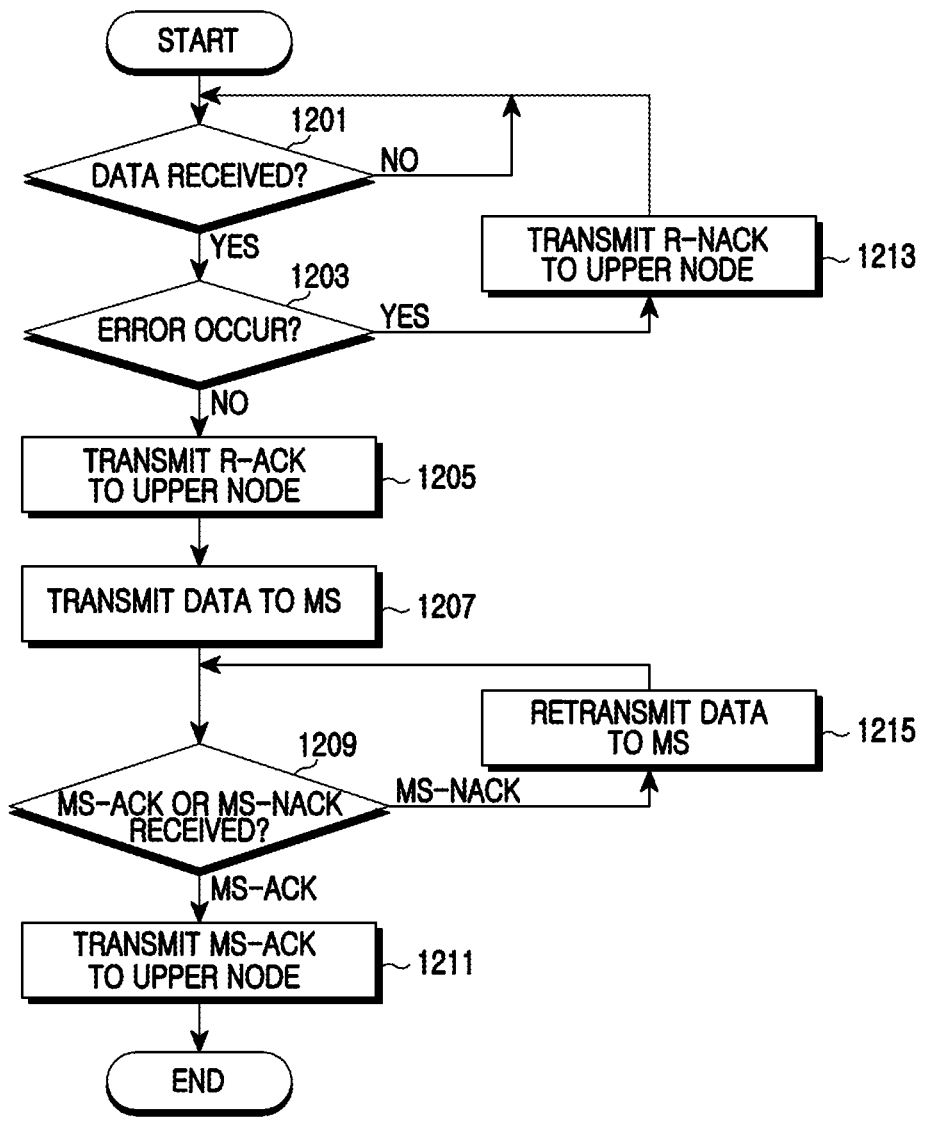
FIG. 12 is a flow diagram illustrating an operation process of an RS according to an exemplary embodiment of the present invention.

FIG. 12 is a flow diagram illustrating an operation process of an RS according to an exemplary embodiment of the present invention.

Referring to FIG. 12, in step 1201, the RS confirms if data is received from an upper node. The upper node represents a BS or an upper RS.

If the data is received, in step 1203, the RS confirms if an error occurs in the data received from the upper node. For example, the RS confirms if an error occurs in the data using an error check code included in a MAC PDU of the data.

If an error occurs in the data, in step 1213, the RS transmits an R-NACK signal for the data received from the upper node, to the upper node.

Then, the RS returns to step 1201 and confirms if data responsive to the R-NACK signal is received from the upper node.

If an error does not occur in the data in step 1203, the RS goes to step 1205 and transmits an R-ACK signal for the data received from the upper node, to the upper node.

After transmitting the R-ACK signal to the upper node, in step 1207, the RS transmits the data received from the upper node, to an MS.

After transmitting the data to the MS, in step 1209, the RS confirms if error occurrence information of an access link is received from the MS. For example, the RS confirms if an MS-NACK signal or MS-ACK signal is received from the MS.

If the MS-NACK signal is received from the MS, in step 1215, the RS retransmits data to the MS in response to the MS-NACK signal received from the MS.

The RS returns to step 1209 and confirms if error occurrence information of an access link on the data retransmitted to the MS is received.

If the MS-ACK signal is received from the MS in step 1209, the RS goes to step 1211 and transmits the MS-ACK signal received from the MS, to the upper node.

The RS then terminates the process according to an exemplary embodiment of the present invention.

In the aforementioned exemplary implementation, the RS transmits error occurrence information on an access link to the BS.

In an exemplary implementation, the RS separates and performs relay link ARQ and access link ARQ and thus, may not transmit error occurrence information of an access link received from the MS to the BS.

Further, in the aforementioned exemplary implementation, the RS excludes an RS-MS timer representing an expiration time of relay link ARQ. The RS drives the RS-MS timer when transmitting data to an MS.

If the RS-MS timer expires, the RS discontinues access link ARQ. At this time, the RS recognizes that transmission of data based on the RS-MS timer fails and transmits an MS-NACK signal to an upper node.

Figure 13:
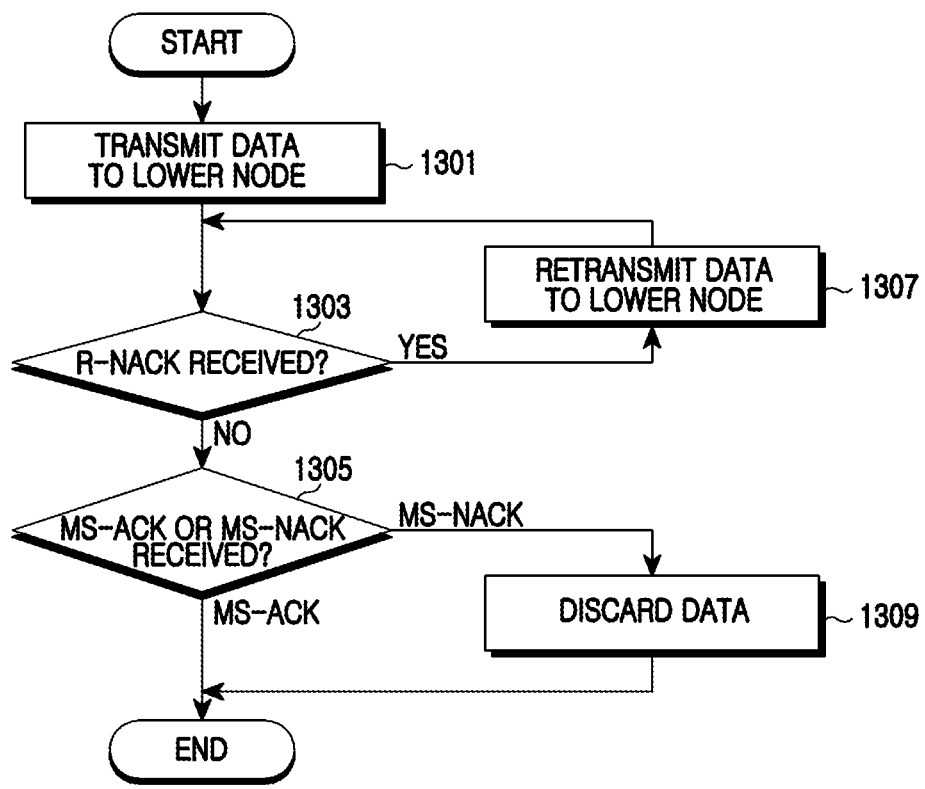
FIG. 13 is a flow diagram illustrating an operation process of a BS according to an exemplary embodiment of the present invention.

A BS may also transmit data as illustrated in FIG. 13 below.

FIG. 13 is a flow diagram illustrating an operation process of a BS according to an exemplary embodiment of the present invention.

Referring to FIG. 13, in step 1301, the BS transmits data to a lower node. That is, the BS transmits data to be transmitted to an MS, to a lower RS.

In step 1303, the BS confirms if error occurrence information of a relay link is received from the lower RS to which the data is transmitted in step 1301. The error occurrence information of the relay link represents an R-ACK signal or R-NACK signal for the data transmitted to the lower RS.

If the R-NACK signal is received from the lower RS, in step 1307, the BS retransmits data to the lower RS in response to the R-NACK signal.

The BS returns to step 1303 and confirms if error occurrence information of a relay link on the retransmitted data is received from the lower RS.

If the R-NACK signal is not received from the lower RS for a certain time, in step 1305, the BS confirms if error occurrence information on an access link is received from the lower RS. The error occurrence information of the access link represents an MS-ACK signal or MS-NACK signal for the data transmitted to the MS from the lower RS.

If the MS-NACK signal is received from the lower RS, in step 1309, the BS discards the data in response to the MS-NACK signal.

If the MS-ACK signal is received from the lower RS, the BS determines that transmission of data responsive to the MS-ACK signal is completed. At this time, the BS discards the data in response to the MS-ACK signal.

The BS terminates the process according to an exemplary embodiment of the present invention.

In the aforementioned exemplary implementation, the BS excludes a BS-MS timer and a BS-RS timer. The BS-MS timer represents an expiration time set to transmit data from the BS to the MS, and the BS-RS timer represents an expiration time of relay link ARQ.

The BS transmits data to a lower node and drives the BS-MS timer and BS-RS timer. At this time, if the BS-RS timer expires, the BS discontinues relay link ARQ. If the BS-RS timer expires, the BS discontinues access link ARQ to the RS accessed by the MS.

Further, in an exemplary implementation, the BS may also confirm a relay link ARQ and access link ARQ execution time using one ARQ timer. In this case, although the relay link ARQ execution time expires, the BS does not terminate the ARQ timer until the access link ARQ execution time expires.

Operation methods of RSs relaying data transmitted from the BS to the MS are described below.

Figure 14:
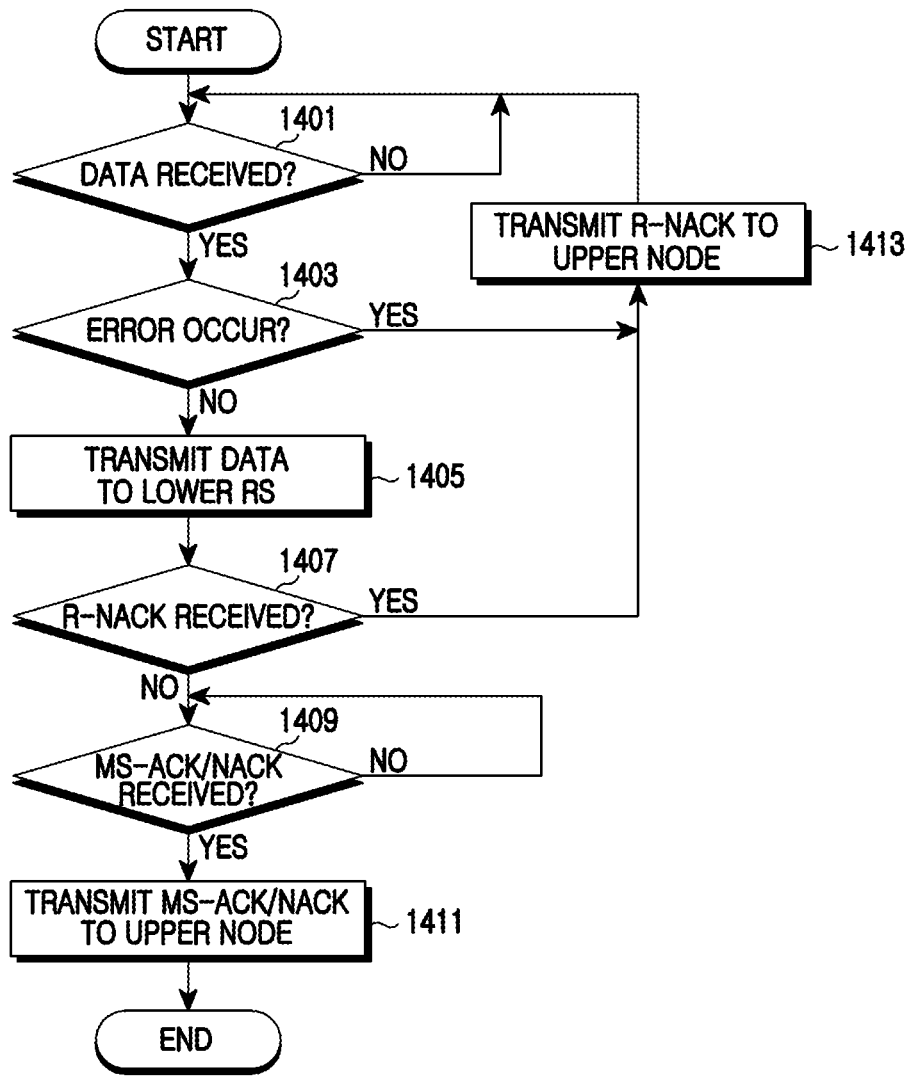
FIG. 14 is a flow diagram illustrating an operation process of an RS according to an exemplary embodiment of the present invention.

First, an RS transmitting data received from a BS to a lower RS operates as illustrated in FIG. 14 below.

FIG. 14 is a flow diagram illustrating an operation process of an RS according to an exemplary embodiment of the present invention.

Referring to FIG. 14, in step 1401, the RS confirms if data is received from an upper node. The upper node represents a BS or an upper RS.

If the data is received, in step 1403, the RS confirms if an error occurs in the data received from the upper node. For example, the RS confirms if an error occurs in the data using an error check code included in a MAC PDU of the data.

If an error occurs in the data, in step 1413, the RS transmits an R-NACK signal for the data received from the upper node, to the upper node.

Then, the RS returns to step 1401 and confirms if data responsive to the R-NACK signal is received from the upper node.

If an error does not occur in the data in step 1403, the RS goes to step 1405 and transmits the non-error data to a lower RS.

After transmitting the data, in step 1407, the RS confirms if error occurrence information of a relay link is received from the lower RS to which the data is transmitted. For example, the RS confirms if an R-NACK signal is received from the lower RS.

If the R-NACK signal is received from the lower RS, in step 1413, the RS transmits the R-NACK signal received from the lower RS, to the upper node.

If the R-NACK signal is not received from the lower RS for a certain time, in step 1409, the BS confirms if error occurrence information on an access link is received from the lower RS. For example, the RS confirms if an MS-NACK signal or MS-ACK signal is received from the lower RS.

If the MS-ACK signal or MS-NACK signal is received from the lower RS, the RS goes to step 1411 and transmits the MS-ACK signal or MS-NACK signal received from the lower RS, to the upper node.

The RS then terminates the process according to an exemplary embodiment of the present invention.

In the aforementioned exemplary implementation, the RS does not control relay link ARQ. If the RS controls the relay link ARQ, the RS operates as illustrated in FIG. 15 below.

Figure 15:
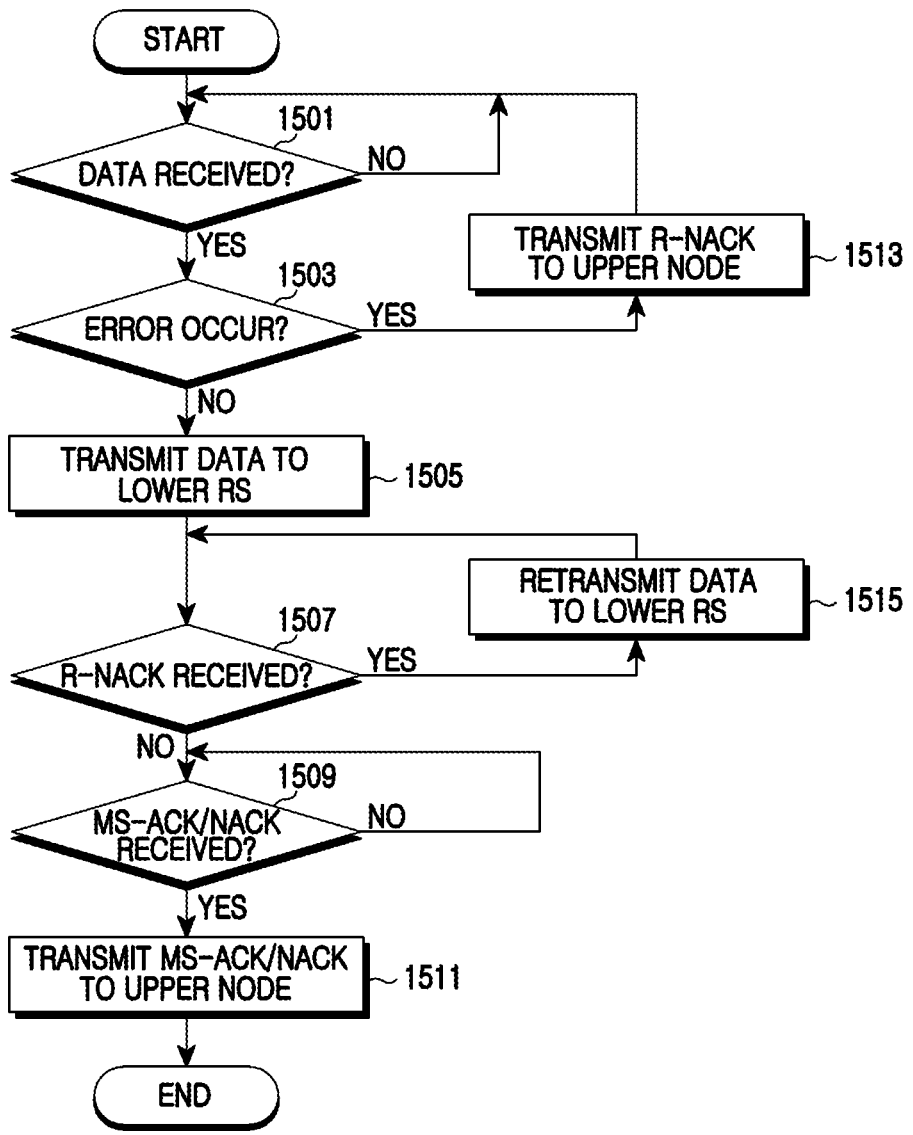
FIG. 15 is a flow diagram illustrating an operation process of an RS according to an exemplary embodiment of the present invention.

FIG. 15 is a flow diagram illustrating an operation process of an RS according to an exemplary embodiment of the present invention.

Referring to FIG. 15, in step 1501, the RS confirms if data is received from an upper node. The upper node represents a BS or an upper RS.

If the data is received, in step 1503, the RS confirms if an error occurs in the data received from the upper node. For example, the RS confirms if an error occurs in the data using an error check code included in a MAC PDU of the data.

If an error occurs in the data, in step 1513, the RS transmits an R-NACK signal for the data received from the upper node, to the upper node.

The RS returns to step 1501 and confirms if data responsive to the R-NACK signal is received from the upper node.

If an error does not occur in the data in step 1503, the RS goes to step 1505 and transmits the non-error data to a lower RS.

After transmitting the data, in step 1507, the RS confirms if an R-NACK signal is received from the lower RS to which the data is transmitted.

If the R-NACK signal is received from the lower RS, in step 1515, the RS retransmits data to the lower RS in response to the R-NACK signal.

If the R-NACK signal for the data is not received from the lower RS for a certain time, in step 1509, the RS confirms if error occurrence information on an access link is received from the lower RS. For example, the RS confirms if an MS-NACK signal or MS-ACK signal for data transmitted by an access link is received from the lower RS.

If the MS-ACK signal or MS-NACK signal is received from the lower RS, the RS goes to step 1511 and transmits the MS-ACK signal or MS-NACK signal received from the lower RS, to the upper node.

The RS then terminates the process according to an exemplary embodiment of the present invention.

In the aforementioned exemplary implementation, the RS excludes an RS-RS timer representing an expiration time of relay link ARQ with a lower RS. The RS drives the RS-RS timer when transmitting data to the lower RS.

If the RS-RS timer expires, the RS discontinues relay link ARQ with the lower RS.

An operation of an RS transmitting data to an MS is described below.

Figure 16:
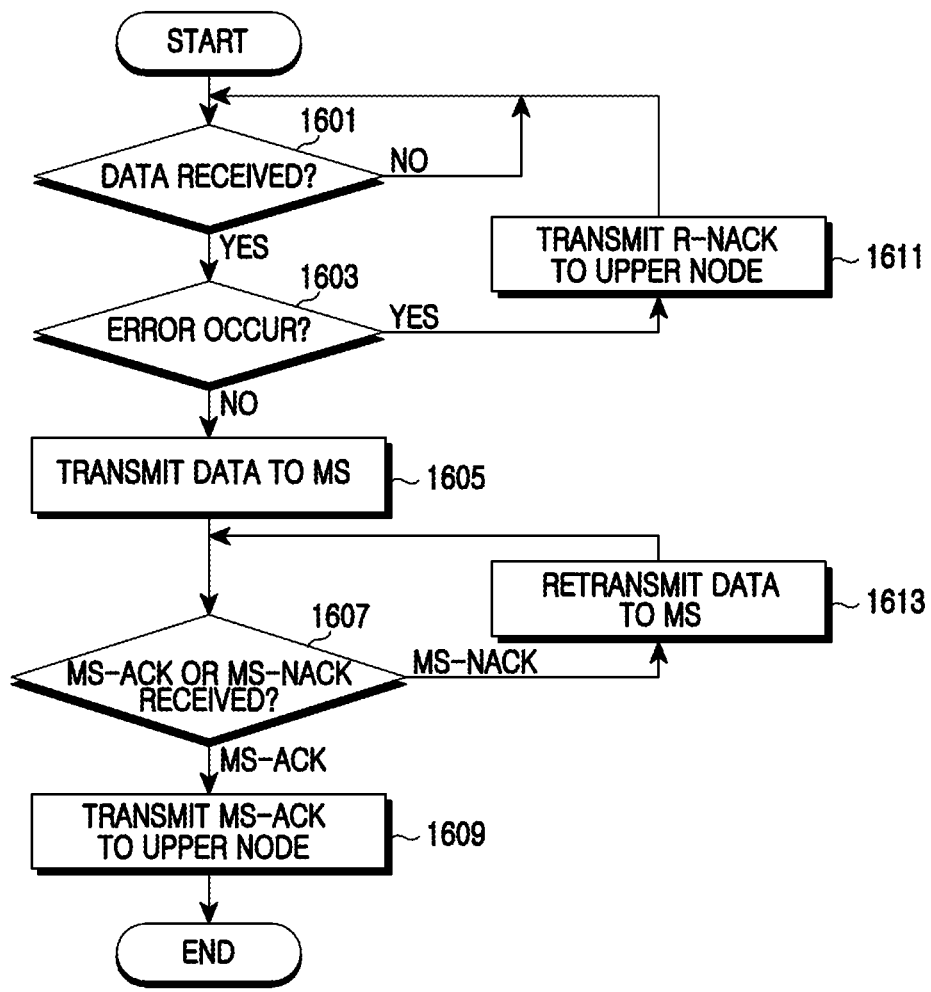
FIG. 16 is a flow diagram illustrating an operation process of an RS according to an exemplary embodiment of the present invention.

FIG. 16 is a flow diagram illustrating an operation process of an RS according to an exemplary embodiment of the present invention.

Referring to FIG. 16, in step 1601, the RS confirms if data is received from an upper node. The upper node represents a BS or an upper RS.

If the data is received, in step 1603, the RS confirms if an error occurs in the data received from the upper node. For example, the RS confirms if an error occurs in the data using an error check code included in a MAC PDU of the data.

If an error occurs in the data, in step 1611, the RS transmits an R-NACK signal for the data received from the upper node, to the upper node.

The RS returns to step 1601 and confirms if data responsive to the R-NACK signal is received from the upper node.

If an error does not occur in the data in step 1603, the RS goes to step 1605 and transmits the non-error data to an MS.

After transmitting data to the MS, in step 1607, the RS confirms if error occurrence information of an access link on the data transmitted to the MS is received. For example, the RS confirms if an MS-NACK signal or MS-ACK signal for the data transmitted by the access link is received from the MS.

If the MS-NACK signal is received from the MS, in step 1613, the RS retransmits data to the MS in response to the MS-NACK signal.

Then, the RS returns to step 1607 and confirms if error occurrence information of the access link on the data retransmitted to the MS is received.

If an MS-ACK signal is received from the MS in step 1607, the RS goes to step 1609 and transmits the MS-ACK signal to the upper node.

The RS then terminates the process according to an exemplary embodiment of the present invention.

In the aforementioned exemplary implementation, the RS transmits error occurrence information on an access link to a BS.

In an exemplary implementation, the RS separates and performs relay link ARQ and access link ARQ and thus, may not transmit error occurrence information of an access link received from the MS to the BS.

Further, in the aforementioned exemplary implementation, the RS excludes an RS-MS timer representing an expiration time of relay link ARQ. The RS drives the RS-MS timer when transmitting data to the MS.

If the RS-MS timer expires, the RS discontinues access link ARQ. At this time, the RS recognizes that transmission of data based on the RS-MS timer fails and transmits an MS-NACK signal to an upper node.

A construction of a BS for transmitting data to an RS is described below.

Figure 17:
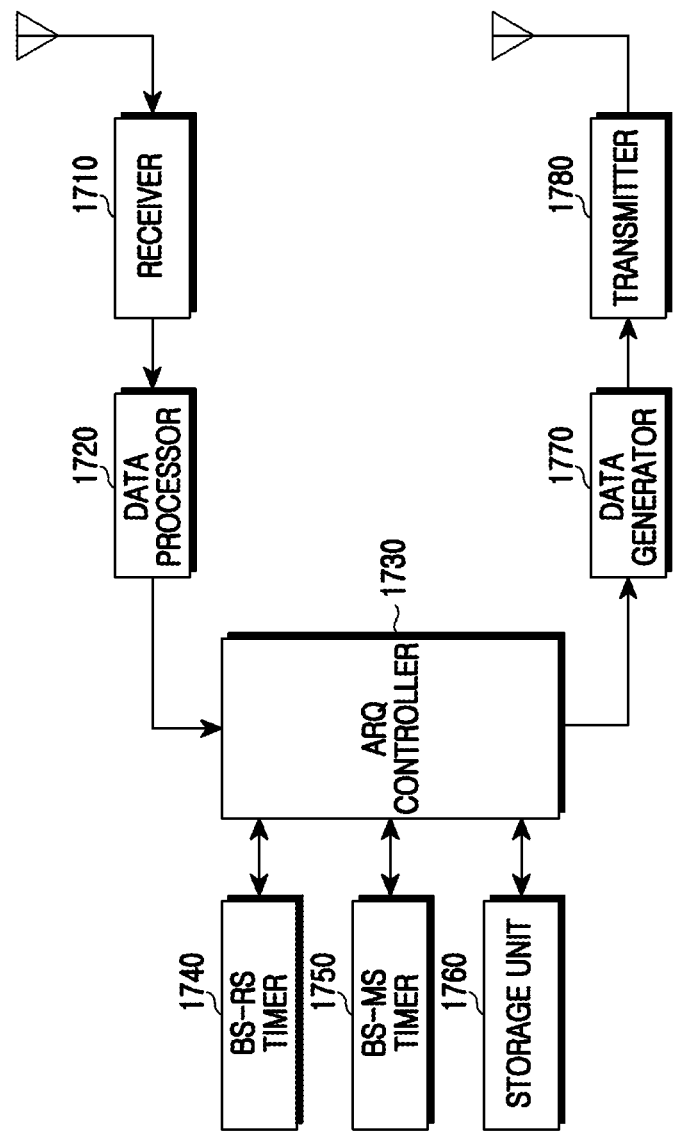
FIG. 17 is a block diagram illustrating a construction of a BS according to an exemplary embodiment of the present invention.

FIG. 17 is a block diagram illustrating a construction of a BS according to an exemplary embodiment of the present invention. The following description is based on the assumption that a transmitter 1780 and a receiver 1710 use a different antenna. However, the transmitter 1780 and the receiver 1710 may use one antenna.

As illustrated in FIG. 17, the BS includes a receiver 1710, a data processor 1720, an ARQ controller 1730, a BS-RS timer 1740, a BS-MS timer 1750, a storage unit 1760, a data generator 1770 and a transmitter 1780.

The receiver 1710 converts a high frequency signal received through an antenna into a baseband signal and demodulates the baseband signal. For example, the receiver 1710 includes an RF processing block, a demodulation block, a channel decoding block and the like. The RF processing block converts a high frequency signal received through the antenna into a baseband signal. The demodulation block is comprised of a Fast Fourier Transform (FFT) operator for extracting data placed on each subcarrier from the signal received from the RF processing block and the like. The channel decoding block may comprise a demodulator, a deinterleaver, a channel decoder and the like.

The data processor 1720 extracts error occurrence information of a relay link and error occurrence information of an access link from a demodulated signal received from the receiver 1710 and provides the extracted error occurrence information to the ARQ controller 1730. The error occurrence information of the relay link includes an R-NACK signal or R-ACK signal for data transmitted to an RS. Also, the error occurrence information of the access link includes an MS-NACK signal or MS-ACK signal for data transmitted to an MS from the RS.

The ARQ controller 1730 controls an ARQ of a relay link depending on the error occurrence information of the relay link received from the data processor 1720. For example, if an R-NACK signal is received from the data processor 1720, the ARQ controller 1730 retransmits data in response to the R-NACK signal. At this time, the ARQ controller 1730 selects data in the storage unit 1760 in response to the R-NACK signal.

If an R-ACK signal is received from the data processor 1720, the ARQ controller 1730 recognizes that transmission of data succeeds. At this time, the ARQ controller 1730 discards data in the storage unit 1760 in response to the R-ACK signal.

If an MS-ACK signal is received from the data processor 1720, the ARQ controller 1730 recognizes that data transmission to an MS through an RS succeeds. At this time, the ARQ controller 1730 discards data stored in the storage unit 1760 in response to the MS-ACK signal.

If an MS-NACK signal is received from the data processor 1720, the ARQ controller 1730 recognizes that data transmission to an MS through an RS fails. At this time, the ARQ controller 1730 discards data stored in the storage unit 1760 in response to the MS-NACK signal.

Also, when transmitting data to an RS, the ARQ controller 1730 drives the BS-RS timer 1740 representing an expiration time of relay link ARQ for the data and the BS-MS timer 1750 representing an expiration time of access link ARQ for the data.

Accordingly, if the BS-RS timer 1740 expires, the ARQ controller 1730 discontinues relay link ARQ with an RS. At this time, the ARQ controller 1730 discards data subjected to the relay link ARQ in the storage unit 1760.

If the BS-MS timer 1750 expires, the ARQ controller 1730 recognizes that data transmission to an MS through an RS fails. At this time, the ARQ controller 1730 discards data subjected to transmission failure in the storage unit 1760 and transmits a reset message to the RS to discontinue access link ARQ with the MS.

If the BS-RS timer 1740 is driven by the ARQ controller 1730, the BS-RS timer 1740 automatically expires when a relay link ARQ processing time of corresponding data expires. If an R-ACK signal for corresponding data is received from an RS before expiration, the BS-RS timer 1740 discontinues driving under control of the ARQ controller 1730.

If the BS-MS timer 1750 is driven by the ARQ controller 1730, the BS-MS timer 1750 automatically expires when an access link ARQ processing time of corresponding data expires. If an MS-ACK signal for corresponding data is received from an RS before expiration, the BS-MS timer 1750 discontinues driving under control of the ARQ controller 1730.

The storage unit 1760 stores data transmitted to a lower node under control of the ARQ controller 1730.

If data transmission succeeds in a relay link or access link, the storage unit 1760 discards corresponding data under control of the ARQ controller 1730. Although data transmission fails in the relay link or access link, the storage unit 1760 discards corresponding data under control of the ARQ controller 1730.

The data generator 1770 generates data to be transmitted to a lower node under control of the ARQ controller 1730. Under control of the ARQ controller 1730, the data generator 1770 may generate original data or perform a process for retransmitting data stored in the storage unit 1760.

The transmitter 1780 converts a control signal and data generated in the data generator 1770 into a high frequency signal and transmits the high frequency signal through an antenna. For example, the transmitter 1780 includes a channel encoding block (not illustrated), a modulation block (not illustrated) and an RF processing block (not illustrated). The channel encoding block includes a channel encoder, an interleaver, a modulator and the like. The modulation block may comprise an Inverse Fast Fourier Transform (IFFT) operator for placing transmitted data on a plurality of orthogonal subcarriers and the like. If the modulation block comprises the IFFT operator, the modulation block may consider an Orthogonal Frequency Division Multiplexing (OFDM) system. In a Code Division Multiple Access (CDMA) system, the IFFT operator may be replaced with a code spreading modulator and the like. The RF processing block converts a baseband signal received from the modulation block into a high frequency signal and outputs the high frequency signal through the antenna.

In the aforementioned exemplary implementation, the BS distinguishes a BS-RS timer 1740 and a BS-MS timer 1750 and confirms a relay link ARQ expiration time and an access link ARQ expiration time.

In an exemplary implementation, the BS may also confirm a relay link ARQ expiration time and an access link ARQ expiration time using one ARQ timer.

A construction of an RS for transmitting data to a lower RS is described below.

Figure 18:
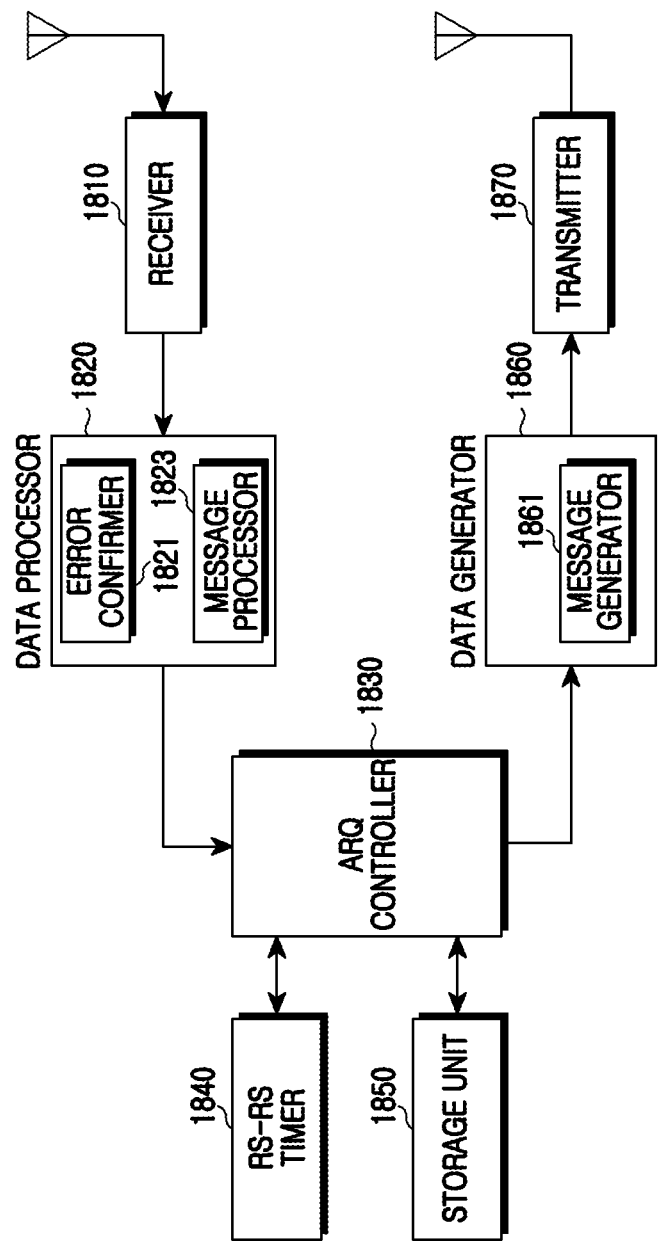
FIG. 18 is a block diagram illustrating a construction of an RS according to an exemplary embodiment of the present invention.

FIG. 18 is a block diagram illustrating a construction of an RS according to an exemplary embodiment of the present invention. The following description is based on the assumption that a transmitter 1870 and a receiver 1810 use a different antenna. However, the transmitter 1870 and the receiver 1810 may use one antenna.

As illustrated in FIG. 18, the RS includes a receiver 1810, a data processor 1820, an ARQ controller 1830, a RS-RS timer 1840, a storage unit 1850, a data generator 1860 and a transmitter 1870.

The receiver 1810 converts a high frequency signal received through an antenna into a baseband signal and demodulates the baseband signal. For example, the receiver 1810 includes an RF processing block, a demodulation block, a channel decoding block and the like. The RF processing block converts a high frequency signal received through the antenna into a baseband signal. The demodulation block comprises an FFT operator for extracting data placed on each subcarrier from the signal received from the RF processing block and the like. The channel decoding block may comprise a demodulator, a deinterleaver, a channel decoder and the like.

The data processor 1820 comprises an error confirmer 1821 and a message processor 1823.

The error confirmer 1821 confirms if an error occurs in a signal received from the receiver 1810. For example, the error confirmer 1821 confirms if an error occurs in data received from the receiver 1810 using an error check code included in a MAC PDU of the data.

The message processor 1823 confirms error occurrence information of a relay link or error occurrence information of an access link received from a lower node and provides the confirmed error occurrence information to the ARQ controller 1830. The error occurrence information of the relay link includes an R-NACK signal or R-ACK signal for data transmitted to a lower RS. Also, the error occurrence information of the access link includes an MS-NACK signal or MS-ACK signal for data transmitted to an MS from the lower RS.

The ARQ controller 1830 transmits error occurrence information of a relay link to an upper node depending on error occurrence information received from the error confirmer 1821. For example, if the error confirmer 1821 confirms that an error occurs in data, the ARQ controller 1830 transmits an R-NACK signal for the data to an upper node to receive retransmission of data. If the error confirmer 1821 confirms that an error does not occur in the data, the ARQ controller 1830 transmits an R-ACK signal for the data to the upper node.

Also, the ARQ controller 1830 transmits data confirmed as non-error data in the error confirmer 1821, to a lower RS. At this time, the ARQ controller 1830 drives the RS-RS timer 1840 to confirm an expiration time of relay link ARQ.

The ARQ controller 1830 controls relay link ARQ depending on error occurrence information of a relay link received from the message processor 1823. For example, if receiving an R-NACK signal from the message processor 1823, the ARQ controller 1830 retransmits data to the lower RS in response to the R-NACK signal. If receiving an R-ACK signal from the message processor 1823, the ARQ controller 1830 transmits the R-ACK signal to the upper node.

At this time, if the RS-RS timer 1840 expires, the ARQ controller 1830 discontinues relay link ARQ. In this case, the ARQ controller 1830 discards data subjected to the relay link ARQ in the storage unit 1850.

The ARQ controller 1830 transmits error occurrence information of an access link confirmed in the message processor 1823 to the upper node.

The RS-RS timer 1840 is driven by the ARQ controller 1830 and expires automatically if a relay link ARQ processing time of corresponding data expires.

The storage unit 1840 stores data transmitted to the lower RS under control of the ARQ controller 1830.

If data transmission succeeds in an access link, the storage unit 1850 discards corresponding data under control of the ARQ controller 1830. Although data transmission fails in the access link, the storage unit 1850 discards corresponding data under control of the ARQ controller 1830.

The data generator 1860 generates data to be transmitted to a lower RS or upper node under control of the ARQ controller 1830. For example, if data received from the upper node has no errors, the data generator 1860 performs a process for transmitting the data to the lower RS under control of the ARQ controller 1830.

The data generator 1860 includes a message generator 1861. The message generator 1861 generates a control message for transmitting error occurrence information of a relay link on data received from the upper node, to the upper node. Also, the message generator 1861 generates a control message for transmitting error occurrence information of a relay link or error occurrence information of an access link received from the lower RS, to the upper node.

The transmitter 1870 converts data generated in the data generator 1860 or a control message into a high frequency signal and transmits the high frequency signal through an antenna. For example, the transmitter 1870 includes a channel encoding block (not illustrated), a modulation block (not illustrated) and an RF processing block (not illustrated). The channel encoding block includes a channel encoder, an interleaver, a modulator and the like. The modulation block may comprise an IFFT operator for placing transmitted data on a plurality of orthogonal subcarriers and the like. If the modulation block comprises the IFFT operator, the modulation block may consider an OFDM system. In a CDMA system, the IFFT operator may be replaced with a code spreading modulator and the like. The RF processing block converts a baseband signal received from the modulation block into a high frequency signal and outputs the high frequency signal through the antenna.

In the aforementioned exemplary implementation, the RS controls relay link ARQ. That is, if an R-NACK signal is received from the lower RS, the RS retransmits data to a lower RS in response to the R-NACK signal.

In an exemplary implementation, the BS may also control relay link ARQ. In this case, the RS transmits error occurrence information of a relay link received from the lower RS to the upper node. At this time, the RS does not include an RS-RS timer 1840.

Further, in the aforementioned exemplary implementation, if an error does not occur in data received from the upper node, the ARQ controller 1830 transmits an R-ACK signal to the upper node.

Also, if an error does not occur in data received from the upper node, the ARQ controller 1830 may also not transmit an R-ACK signal to the upper node.

A construction of an RS for transmitting data to an MS is described below.

Figure 19:
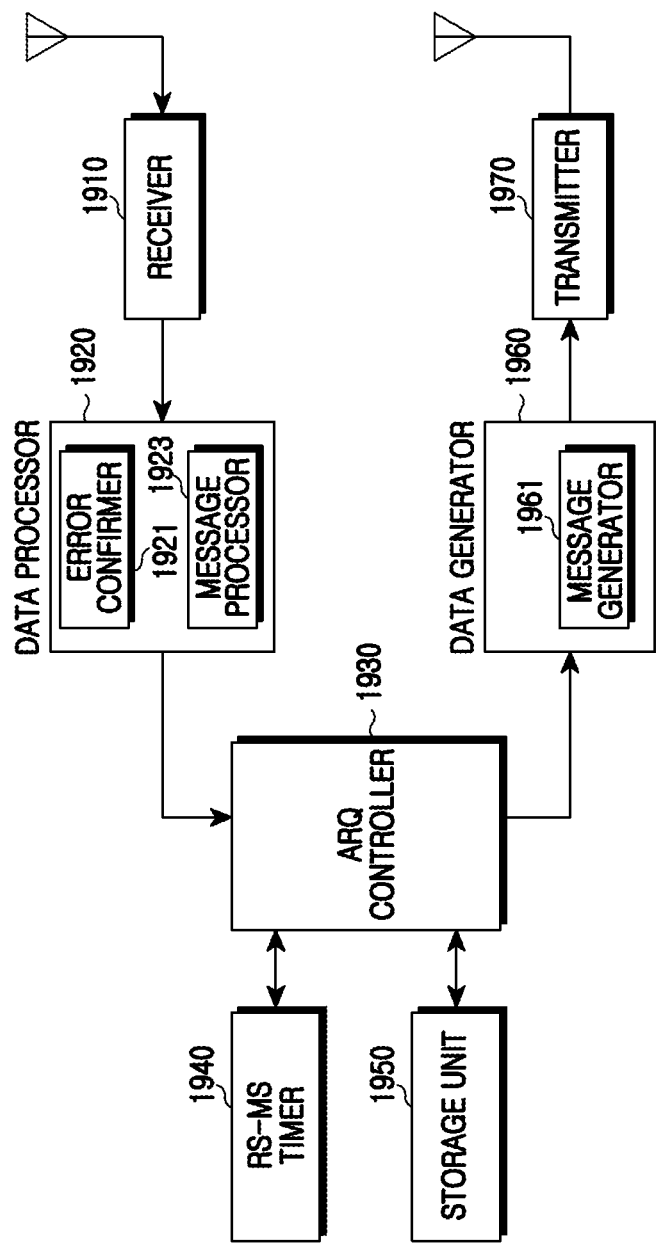
FIG. 19 is a block diagram illustrating a construction of an RS according to an exemplary embodiment of the present invention.

FIG. 19 is a block diagram illustrating a construction of an RS according to an exemplary embodiment of the present invention. The following description is based on the assumption that a transmitter 1970 and a receiver 1910 use a different antenna. However, the transmitter 1970 and the receiver 1910 may use one antenna.

As illustrated in FIG. 19, the RS includes a receiver 1910, a data processor 1920, an ARQ controller 1930, an RS-MS timer 1940, a storage unit 1950, a data generator 1960 and a transmitter 1970.

The receiver 1910 converts a high frequency signal received through an antenna into a baseband signal, and demodulates the baseband signal. For example, the receiver 1910 includes an RF processing block, a demodulation block, a channel decoding block and the like. The RF processing block converts a high frequency signal received through the antenna into a baseband signal. The demodulation block comprises an FFT operator for extracting data placed on each subcarrier from the signal received from the RF processing block and the like. The channel decoding block may comprise a demodulator, a deinterleaver, a channel decoder and the like.

The data processor 1920 comprises an error confirmer 1921 and a message processor 1923.

The error confirmer 1921 confirms if an error occurs in the signal received from the receiver 1910. For example, the error confirmer 1921 confirms if an error occurs in data received from the receiver 1910 using an error check code included in a MAC PDU of the data.

The message processor 1923 confirms access link error occurrence information received from an MS and provides the confirmed error occurrence information to the ARQ controller 1930. The access link error occurrence information includes an MS-NACK signal or MS-ACK signal for data transmitted to the MS.

The ARQ controller 1930 transmits error occurrence information of a relay link to an upper node depending on error occurrence information received from the error confirmer 1921. For example, if the error confirmer 1921 confirms that an error occurs in data, the ARQ controller 1930 transmits an R-NACK signal to an upper node to receive retransmission of data. If the error confirmer 1921 confirms that an error does not occur in the data, the ARQ controller 1930 transmits an R-ACK signal for the data to the upper node.

Also, the ARQ controller 1930 transmits data confirmed as non-error data in the error confirmer 1921, to an MS. At this time, the ARQ controller 1930 drives the RS-MS timer 1940 to confirm an expiration time of relay link ARQ.

The ARQ controller 1930 controls relay link ARQ depending on error occurrence information of an access link received from the message processor 1923. For example, if receiving an MS-NACK signal from the message processor 1923, the ARQ controller 1930 retransmits data to an MS in response to the MS-NACK signal. If receiving an MS-ACK signal from the message processor 1923, the ARQ controller 1930 recognizes the MS-ACK signal as a data transmission success. At this time, the ARQ controller 1930 may transmit or may not transmit the data transmission success of the access link to an upper node. Also, if transmission of data succeeds, the ARQ controller 1930 discards the data in the storage unit 1950.

If the RS-MS timer 1940 expires, the ARQ controller 1930 discontinues access link ARQ. In this case, the ARQ controller 1930 discards data subjected to the access link ARQ in the storage unit 1950.

The RS-MS timer 1940 is driven by the ARQ controller 1930 and expires automatically if a relay link ARQ processing time of corresponding data expires.

The storage unit 1940 stores data transmitted to an MS under control of the ARQ controller 1930.

If data transmission succeeds in an access link, the storage unit 1950 discards corresponding data under control of the ARQ controller 1930. Although data transmission fails in the access link, the storage unit 1950 discards corresponding data under control of the ARQ controller 1930.

The data generator 1960 generates data to be transmitted to an MS under control of the ARQ controller 1930. At this time, under control of the ARQ controller 1930, the data generator 1960 may generate original data or perform a process for retransmitting data stored in the storage unit 1950.

The data generator 1960 includes a message generator 1961. The message generator 1961 generates a control message for transmitting error occurrence information of a relay link on data received from an upper node, to the upper node. Also, the message generator 1961 generates a control message for transmitting error occurrence information of an access link received from an MS, to the upper node. The message including the error occurrence information of the relay link includes an R-NACK signal or R-ACK signal for data received from the upper node.

The transmitter 1970 converts data generated in the data generator 1960 or a control message into a high frequency signal and transmits the high frequency signal through an antenna. For example, the transmitter 1970 includes a channel encoding block (not illustrated), a modulation block (not illustrated) and an RF processing block (not illustrated). The channel encoding block includes a channel encoder, an interleaver, a modulator and the like. The modulation block may comprise an IFFT operator for placing transmitted data on a plurality of orthogonal subcarriers and the like. If the modulation block comprises the IFFT operator, the modulation block may consider an OFDM system. In a CDMA system, the IFFT operator may be replaced with a code spreading modulator and the like. The RF processing block converts a baseband signal received from the modulation block into a high frequency signal and outputs the high frequency signal through the antenna.

In the aforementioned exemplary implementation, if an error does not occur in data received from an upper node, an ARQ controller 1930 transmits an R-ACK signal to the upper node.

In an exemplary implementation, if an error does not occur in data received from an upper node, the ARQ controller 1930 may not transmit an R-ACK signal to the upper node.

Further, in the aforementioned exemplary implementation, the RS and the MS determine if an error occurs in data received from one upper node and perform relay link ARQ or access link ARQ.

Also, when using a cooperative relay scheme receiving data from a plurality of upper nodes, the RS and the MS may equally determine if an error occurs in data received from upper nodes and perform relay link ARQ or access link ARQ.

As described above, there is an advantage for separating and performing relay link ARQ and access link ARQ in a wireless communication system using relay. Accordingly, efficiency of data retransmission according to an ARQ of a MAC layer is enhanced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing Automatic Retransmission reQuest (ARQ) in a Relay Station (RS) of a wireless communication system, the method comprising:
receiving data from a Base Station (BS);
transmitting data to at least one lower node, wherein the lower node includes at least one of a lower RS and a Mobile Station (MS);
if Negative ACKnowledgement (NACK) information of a relay link is received from the lower RS, transmitting the NACK information to the BS;
receiving, by the RS, data retransmitted from the BS; and
transmitting, by the RS, the data retransmitted from the BS to the lower RS,
wherein if NACK information of an access link is received from the MS which is accessed directly with the RS, retransmitting data to the MS in response to the NACK information of the access link.

2. The method of claim 1, further comprising:
driving a timer for confirming an ARQ expiration time of the access link when transmitting the data to the MS; and
if it is determined that the ARQ expiration time of the access link is exceeded through the timer, recognizing that the data transmission to the MS fails.

3. The method of claim 2, further comprising, if it is determined that the ARQ expiration time of the access link is exceeded through the timer, transmitting NACK information of the access link to the BS.

4. The method of claim 1, wherein the transmitting of data to the at least one lower node comprises:
determining whether data received from the BS contains an error; and
when the error is not detected in the data, transmitting data to at least one lower node.

5. The method of claim 4, further comprising:
when the error is not detected in the data, transmitting ACK information to the BS.

6. The method of claim 4, further comprising:
when the error is detected in the data, transmitting NACK information to the BS; and
receiving data retransmitted from the BS.

7. The method of claim 1, wherein the relay link includes a link between the BS and the RS, and a link between the RS and a lower RS.

8. The method of claim 1, further comprising:
when ACK information of the access link is received from the MS, transmitting ACK information to the BS.

9. An apparatus for performing Automatic Retransmission reQuest (ARQ) in a Relay Station (RS) of a wireless communication system, the apparatus comprising:
a receiver for receiving data from a Base Station (BS);
a transmitter for transmitting data to at least one lower node, wherein the lower node includes at least one of a lower RS and a Mobile Station (MS); and
an ARQ controller for, if Negative ACKnowledgement (NACK) information of the relay link is received from the lower RS, transmitting the NACK information via a transmitter to the BS,
wherein if data in response to the NACK information of the relay link is received by the RS from the BS, the ARQ controller located in the RS transmits the data retransmitted from the BS to the lower RS,
wherein if NACK information of an access link is received from the MS which is accessed directly with the RS, the ARQ controller retransmits data to the MS in response to the NACK information of the access link.

10. The apparatus of claim 9, further comprising a timer driven when the transmitter transmits data to the MS,
wherein, if it is determined that the ARQ expiration time of the access link exceeds through the timer, the ARQ controller recognizes that the data transmission to the MS fails.

11. The apparatus of claim 10, wherein, if it is determined that the ARQ expiration time of the access link exceeds through the timer, the ARQ controller transmits NACK information of the access link to the BS using the transmitter.

12. The apparatus of claim 9, wherein the ARQ controller determines whether data received from the BS contains an error, and transmits data to at least one lower node when the error is not detected in the data.

13. The apparatus of claim 12, wherein the ARQ controller transmits ACK information to the BS when the error is not detected in the data.

14. The apparatus of claim 12, wherein the ARQ controller transmits NACK information to the BS when the error is detected in the data, and receives data retransmitted from the BS.

15. The apparatus of claim 9, wherein the relay link includes a link between the BS and the RS, and a link between the RS and a lower RS.

16. The apparatus of claim 9, wherein the ARQ controller transmits ACK information to the BS when ACK information of the access link is received from the MS.

* * * * *